US012625524B2

(12) United States Patent
Emmert et al.

(10) Patent No.: US 12,625,524 B2
(45) Date of Patent: May 12, 2026

(54) DEFORMABLE ELECTRONIC DEVICES AND CORRESPONDING METHODS AND SYSTEMS FOR DETERMINING DEFORMATION STATES

(71) Applicant: Motorola Mobility LLC, Chicago, IL (US)

(72) Inventors: Steve C Emmert, McHenry, IL (US); Eric J Hefner, Lombard, IL (US); Bill Ryan, Libertyville, IL (US)

(73) Assignee: Motorola Mobility LLC, Chicago, IL (US)

( * ) Notice: Subject to any disclaimer, the term of this patent is extended or adjusted under 35 U.S.C. 154(b) by 286 days.

(21) Appl. No.: 18/382,396

(22) Filed: Oct. 20, 2023

(65) Prior Publication Data

US 2025/0133158 A1     Apr. 24, 2025

(51) Int. Cl.
*G06F 1/16* (2006.01)

(52) U.S. Cl.
CPC .......... *G06F 1/1681* (2013.01); *G06F 1/1652* (2013.01)

(58) Field of Classification Search
CPC .... G06F 1/1624; G06F 1/1616; G06F 1/1618; G06F 1/1681; G06F 1/1637; H04M 1/0268; H04M 1/022; H04M 1/0241
See application file for complete search history.

(56) References Cited

U.S. PATENT DOCUMENTS

| | | | |
|---|---|---|---|
| 5,340,072 A | 8/1994 | Halbert | |
| 5,744,937 A | 4/1998 | Cheon | |
| 9,663,297 B1 | 5/2017 | Steinhoff et al. | |
| 10,063,677 B2 | 8/2018 | Cavallaro et al. | |
| 11,522,985 B1 | 12/2022 | Lim et al. | |
| 11,747,874 B2 | 9/2023 | Choi | |
| 2004/0155503 A1 | 8/2004 | Stumpf et al. | |
| 2012/0274613 A1 | 11/2012 | Ishizuka | |
| 2014/0370345 A1 | 12/2014 | Maleki et al. | |
| 2018/0039310 A1 | 2/2018 | Oga | |
| 2018/0224871 A1 | 8/2018 | Sahu | |
| 2018/0275715 A1* | 9/2018 | Park | G06F 1/16 |
| 2019/0272020 A1 | 9/2019 | Woo | |
| 2019/0305563 A1 | 10/2019 | Koki | |

(Continued)

OTHER PUBLICATIONS

Auve, Glenn A. , "Non-Final Office Action", U.S. Appl. No. 18/132,207, filed Apr. 7, 2023; Mailed Aug. 27, 2024.

(Continued)

*Primary Examiner* — Sagar Shrestha
(74) *Attorney, Agent, or Firm* — Philip H Burrus, IV

(57) ABSTRACT

A deformable electronic device includes a flexible display supported by a deformable housing comprising a plurality of linkage members and one or more magnet magnetometer pairs. Each magnet magnetometer pair includes a magnetometer situated in a linkage member of the plurality of linkage members and at least one corresponding magnet situated in another linkage member of the plurality of linkage members that is adjacent to the linkage member among the plurality of linkage members. One or more processors operable with one or more magnetometers of the one or more magnet magnetometer pairs are configured to identify a deformed shape of the deformable electronic device from signals received from the one or more magnetometers.

20 Claims, 12 Drawing Sheets

(56) References Cited

U.S. PATENT DOCUMENTS

| | | | |
|---|---|---|---|
| 2020/0036198 A1 | 1/2020 | Kim | |
| 2021/0004065 A1 | 1/2021 | Chandra | |
| 2021/0320504 A1 | 10/2021 | Choi | |
| 2021/0341981 A1 | 11/2021 | Files | |
| 2021/0365074 A1* | 11/2021 | Mehandjiysky | H04M 1/0216 |
| 2021/0405693 A1* | 12/2021 | Holung | G06F 1/1681 |
| 2022/0060032 A1 | 2/2022 | Jeong | |
| 2022/0255326 A1 | 8/2022 | Carlson | |
| 2023/0011107 A1* | 1/2023 | Kim | G06F 1/1652 |
| 2023/0047246 A1* | 2/2023 | An | G06F 1/1652 |
| 2023/0132431 A1 | 5/2023 | Kwak | |
| 2023/0176803 A1* | 6/2023 | Jin | G06F 3/1431 |
| | | | 345/1.3 |
| 2023/0236705 A1* | 7/2023 | Lee | G06F 3/04886 |
| | | | 715/765 |
| 2023/0269313 A1 | 8/2023 | Chang | |
| 2024/0103592 A1 | 3/2024 | Lee | |
| 2024/0302867 A1* | 9/2024 | Wang | H04M 1/0214 |
| 2024/0333825 A1* | 10/2024 | Hu | H04M 1/0245 |
| 2025/0016256 A1* | 1/2025 | Chang | H04M 1/0216 |
| 2025/0343847 A1* | 11/2025 | Rhee | H04M 1/0264 |

OTHER PUBLICATIONS

Vieira, Alexandre , "PCT Search Report", PCT/CN/2023/081636; Mailed Sep. 20, 2023.

Vieira, Alexandre , "PCT Search Report", PCT/CN2023/081728; Mailed Sep. 22, 2023.

Emmert, Steve C. , "Deformable Electronic Devices and Methods for Constructing the Same", Application as Filed Jun. 23, 2023; U.S. Appl. No. 18/213,679.

Kumar Agrawal, et al., "Electronic Devices with Multiples Energy Storage Devices, Thermal Mitigation Circuits, and Corresponding Methods", Application as Filed Apr. 7, 2023; U.S. Appl. No. 18/132,210.

Sisodia, Rohit et al., "Electronic Devices with Multiple Energy Storage Devices, Thermal Mitigation Circuits, and Corresponding Methods", Application As Filed Apr. 7, 2023; U.S. Appl. No. 18/132,207.

* cited by examiner

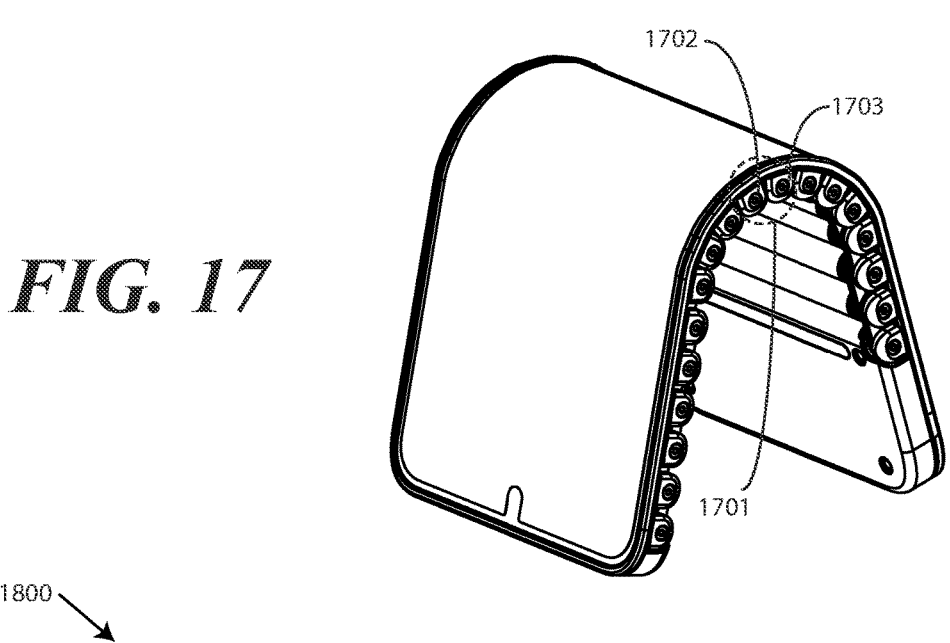

| POSE | ACCEL. READINGS | BEND CONDITIONS | | | | POSE DET. REQUIRES |
|---|---|---|---|---|---|---|
| FLAT | GRAVITY VECTORS ALIGNED | Link 8 < 10% | Link 14 < 10% | Link 3 < 10% | | BEND ONLY |
| WRAP | GRAVITY VECTORS >160 deg. apart in Y/Z Plane | Link 8 > 55% | 10%< Link 14 <85% | 10%< Link 3 <85% | Link 14+ Link 3 > 30% | BEND OR GRAVITY |
| L STAND | Top Gravity Vector <45 deg. from vert., Base Gravity Vector nearly flat | Link 8 ignore | Link 14 < 10% | Link 3 > 90% | | BEND AND GRAVITY |
| L PAD | Top Gravity Vector <45 deg. from vert., Base Gravity Vector nearly 45 deg. from vertical | Link 8 ignore | Link 14 < 10% | Link 3 > 90% | | BEND AND GRAVITY |
| TENT LEAN BACK | Base Gravity Vector nearly flat, Top Gravity Vector nearly 45 deg. from vertical | Link 8 > 80% | Link 14 < 20% | Link 3 < 40% | | BEND AND GRAVITY |
| TENT PAD | +Y for Base Gravity Vector, -Y for Top Gravity Vector, neither near flat | Link 8 >80% | Link 14 < 20% | Link 3 < 40% | | BEND AND GRAVITY |

FIG. 18

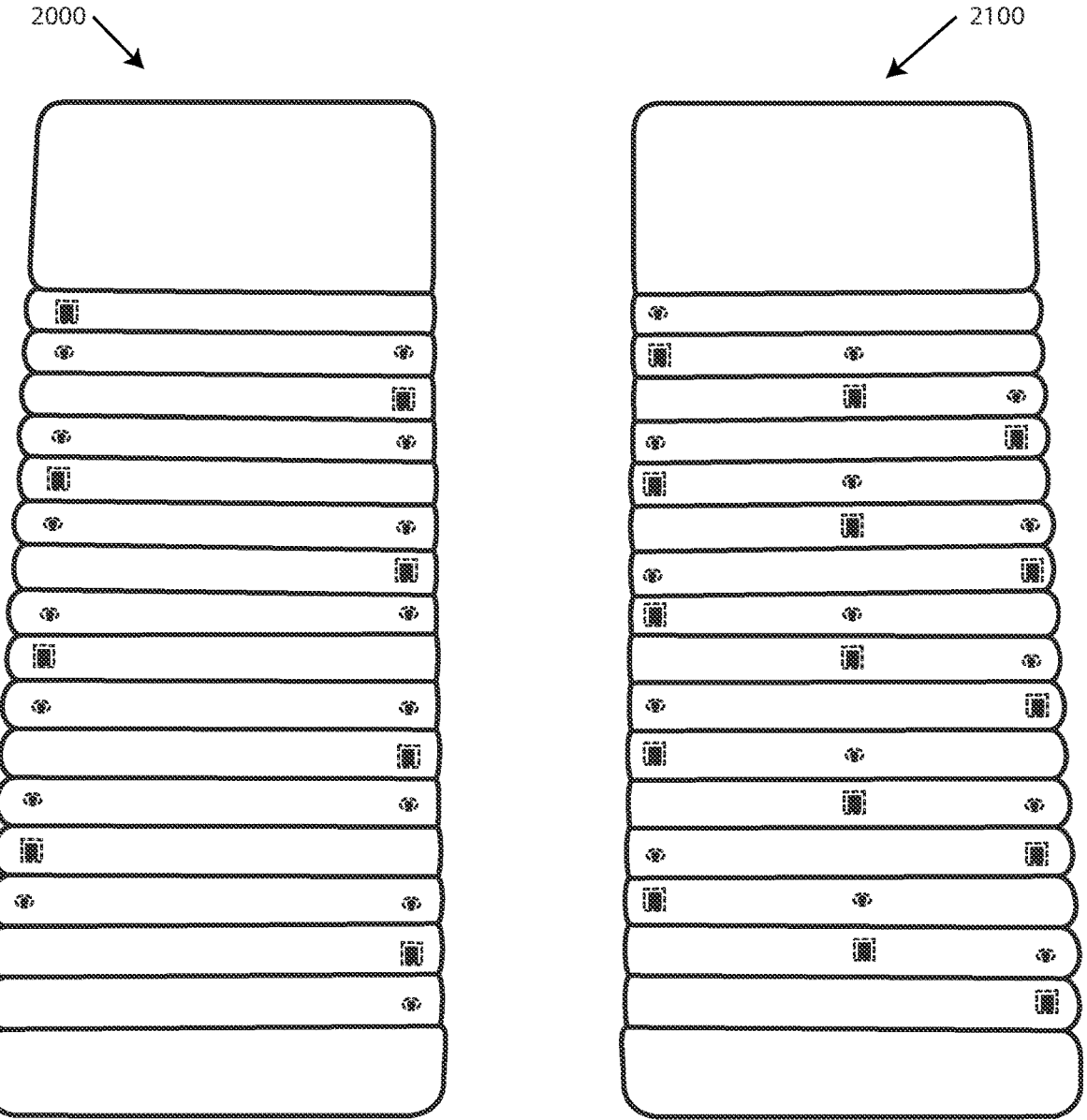
FIG. 20          FIG. 21

2200

CONFIGURE
DEVICE IN
FLAT
POSITION

2201

STORE MAGNETIC
BIASES FOR EACH
SENSOR AS
FLAT BASELINE

2202

BEND DEVICE
TO WRAP
POSITION WITH
SMALLEST RADIUS

2203

MEASURE MAX
MAGNETIC FIELD FOR
EACH SENSOR/STORE
AS DEF. BASELINE

2204

OPTIONALLY REPEAT
FOR OTHER STATES
(ACCOUNT FOR
NON-LINEARITY)

2205

DEFORMABLE ELECTRONIC DEVICES AND CORRESPONDING METHODS AND SYSTEMS FOR DETERMINING DEFORMATION STATES

BACKGROUND

Technical Field

This disclosure relates generally to electronic devices, and more particularly to deformable.

Background Art

Portable electronic communication devices, especially smartphones, have become ubiquitous. People all over the world use such devices to stay connected. These devices have been designed in various mechanical configurations. A first configuration, known as a "candy bar," is generally rectangular in shape, has a rigid form factor, and has a display disposed along a major face of the electronic device. By contrast, a "clamshell" device has a mechanical hinge that allows one housing to pivot relative to the other.

Some consumers prefer fixed geometric configuration devices such as candy bar devices. However, many others prefer deformable electronic devices such as clamshell devices. It would be advantageous to have an improved electronic device can operate in both deformed and non-deformed states.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 17 illustrates one explanatory magnet magnetometer system for detecting deformation of a deformable electronic device to a tent shape in accordance with one or more embodiments of the disclosure.

FIG. 18 illustrates explanatory magnet magnetometer pair and accelerometer thresholds suitable for detecting one or more predefined deformed shapes of a deformable electronic device in accordance with one or more embodiments of the disclosure.

FIG. 20 illustrates another explanatory deformable electronic device with cut-away portions showing another explanatory magnet magnetometer system in accordance with one or more embodiments of the disclosure.

FIG. 21 illustrates still another explanatory deformable electronic device with cut-away portions showing still another explanatory magnet magnetometer system in accordance with one or more embodiments of the disclosure.

Figure 1:
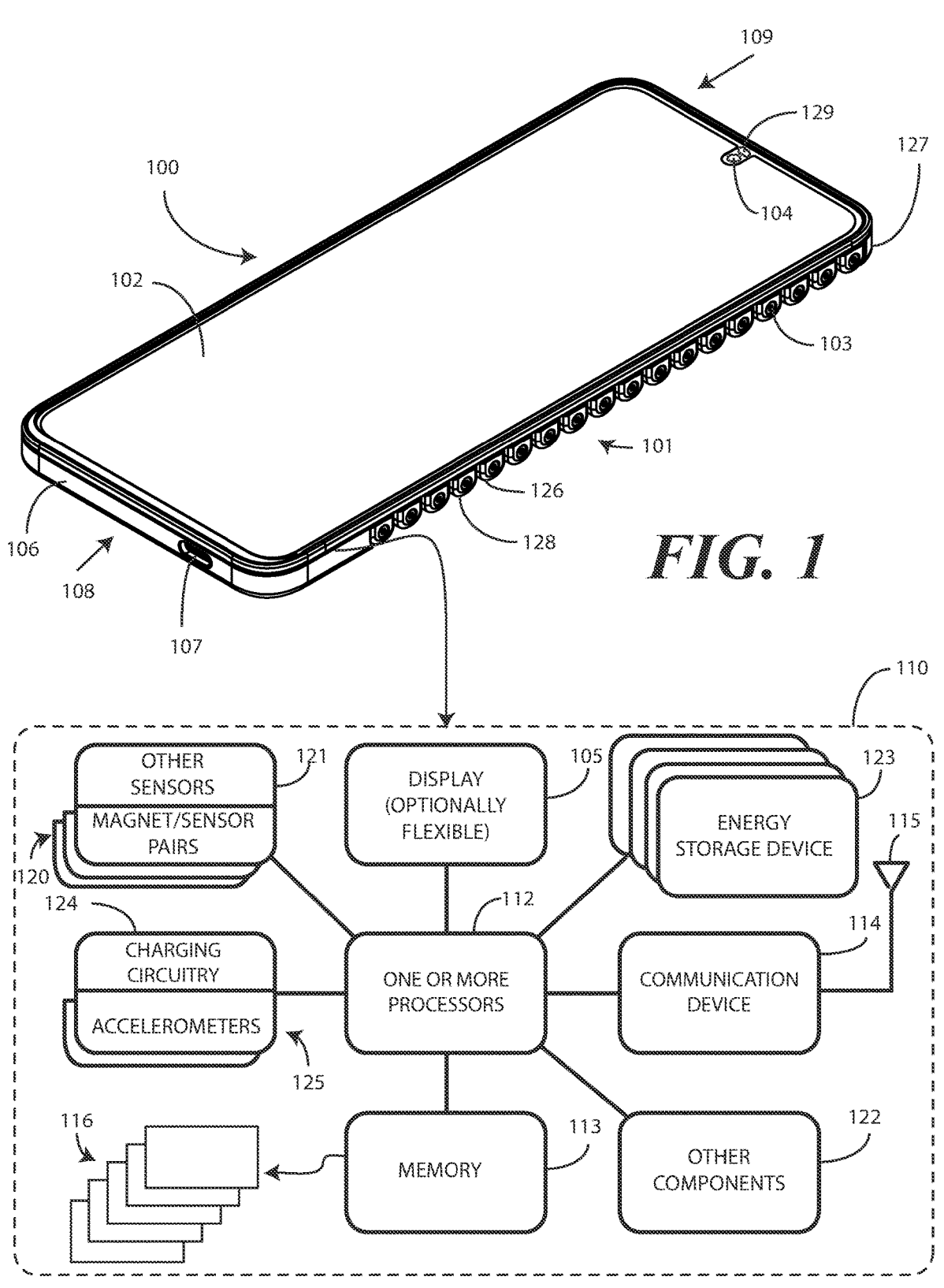
FIG. 1 illustrates one explanatory deformable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to identifying, by one or more processors from a magnet magnetometer system, a deformed shape of a deformable electronic device from signals from the magnet magnetometer system. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of detecting, by one or more processors from a plurality of magnet magnetometer pairs carried by a plurality of linkage members spanning a flexible display of a deformable electronic device, whether the deformable electronic device is deformed to a particular shape selected from a predefined plurality of shapes, and writing the deformed shape of the deformable electronic device to a memory of the deformable electronic device. The non-processor circuits may include, but are not limited to, a control circuit, switches, Hall-effect sensors, signal busses, diodes, signal drivers, clock circuits, power source circuits, and user input devices.

As such, these functions may be interpreted as steps of a method to determine whether a deformable electronic device is deformed, and into what shape, from signals from one or more magnet magnetometer pairs carried by one or more linkage members of the deformable electronic device, as described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide circuits, sensors, and methods for determining to what deformed shape a deformable electronic device is deformed. In one or more embodiments, the deformable electronic device comprises a flexible display supported by a deformable housing comprising a plurality of linkage members. In one or more embodiments, one or more magnet magnetometer pairs are situated within the deformable housing. Illustrating by example, in one or more embodiments each magnet magnetometer pair comprises a magnetometer situated in a linkage member of the plurality of linkage members and at least one corresponding magnet situated in another linkage member of the plurality of linkage members that is adjacent to the linkage member carrying the magnetometer among the plurality of linkage members. In one or more embodiments, one or more processors are operable with the magnetometers of the one or more magnet magnetometer pairs. In one or more embodiments, the one or more processors identify a deformed shape of the deformable electronic device from signals received from the one or more magnetometers.

Illustrating by example, in one or more embodiments a predefined plurality of deformed shapes comprises a wrap shape, an L shape, and a tent shape. In one or more embodiments, the L shape can be in a "pad" orientation, with ends of the L abutting a support surface, or in a "stand" orientation with a minor planar surface of the deformed flexible display abutting a support surface. Similarly, the tent shape can be a pad orientation with ends of the tent abutting a support surface or a "lean back" orientation with a planar portion of the deformed flexible display abutting the support surface. In one or more embodiments, the one or more processors can determine, using signals from the magnetometers of the magnet magnetometer pairs, optionally in conjunction with signals from accelerometers situated in the deformable housing, whether the deformable electronic device is in an undeformed state, a wrap shape, an L pad shape, an L stand shape, a tent pad shape, a tent lean back shape, or another shape, as this list of shapes is but an explanatory list with others being obvious to those of ordinary skill in the art having the benefit of this disclosure.

In one or more embodiments, a method in a deformable electronic device comprises detecting, by one or more processors from a plurality of magnet magnetometer pairs carried by a plurality of linkage members spanning a flexible display with each magnet magnetometer pair having a magnet and a magnetometer situated in adjacent linkage members, whether the deformable electronic device is in a deformed shape selected form a predefined plurality of deformed shapes or in an undeformed shape. In one or more embodiments, the method comprises writing the detected shape of the deformable electronic device to memory. In one or more embodiments, this identified "state" of the deformable electronic device remains until another undeformed shape or deformed shape is detected, thereby providing hysteresis between states. In one or more embodiments, this detected shape can be used by applications operating on one or more processors of the electronic device to control where and what content is presented on the flexible display and other operations.

Said differently, since the deformable electronic device can change form factors dynamically while in operation, embodiments of the disclosure contemplate that the visible area available to a user can change while content is actively, and dynamically, being presented. Illustrating by example, if the deformable electronic device is in the undeformed or flat shape, the entire area of the flexible display may be visible. By contrast, if the deformable electronic device is deformed to the tent shape, only half of the available area of the flexible display will be visible, and so forth. One benefit of the tent shape is that half of the display is visible from one direction and another half is visible from the opposite direction. Thus, one side of the display can be visible to a first person while another side of the display is visible to another person. This "dual visibility" of a single display can be useful, for example, when two people are playing a game. Other benefits of the tent shape—as well as other shapes—will be obvious to those of ordinary skill in the art having the benefit of this disclosure.

Advantageously, when one or more processors of the electronic device can determine whether the deformable electronic device is deformed, and into what shape, from signals received from magnet magnetometer pairs, applications operating on the one or more processors can dynamically adjust the content presentation of the flexible display as a function of the geometric configuration of that deformable electronic device. Thus, if a user is watching a television show when the deformable electronic device is undeformed and flat, thereby using all of the flexible display of the deformable electronic device to watch the show, and then bends the deformable electronic device to a wrap shape so as to wear it around their wrist, the detection of this deformed shape from the magnet magnetometer pairs allows the application presenting the television show to dynamically and seamlessly, cause the television show to morph to adjust the visible area available on the deformable electronic device after the deformable electronic device is deformed. This is just one conceivable benefit of being able to detect whether the deformable electronic device is deformed, and to what shape, using one or more magnet magnetometer pairs. Other advantages will be obvious to those of ordinary skill in the art having the benefit of this disclosure.

In one or more embodiments, a deformable electronic device comprises a flexible display spanning a first major surface of the deformable electronic device and a plurality of linkage members situated along a second major surface of the deformable electronic device. In one or more embodiments, at least some linkage members of the plurality of linkage members have situated therein one or more energy storage devices. In one or more embodiments, the deformable electronic device comprises one or more processors and at least a first magnetometer situated in a first linkage member, a first magnet situated in a second linkage member that is adjacent to the first linkage member, a second magnetometer situated in a third linkage member, and a second magnet situated in a fourth linkage member that is adjacent to the third linkage member. In one or more embodiments, the one or more processors are configured to determine whether the deformable electronic device is deformed, and into what shape, from signals from the first magnetometer and second magnetometer.

Embodiments of the disclosure contemplate that one, two, three, four, or more magnet magnetometer pairs can be included in such a deformable electronic device. Illustrating by example, the deformable electronic device may include a third magnetometer situated in a fifth linkage member and a third magnet situated within a sixth linkage member that is adjacent to the fifth linkage member. Accordingly, the one or more processors can determine whether the deformable electronic device is deformed, and into what shape, from signals from one or more of the first magnetometer, the second magnetometer, and/or the third magnetometer. In one or more embodiments, each magnet magnetometer pair can be separated from other magnet magnetometer pairs by one, two, three or more linkage members.

In other embodiments, such as those illustrated below with reference to FIGS. 20-21, each linkage member of the plurality of linkage members can include either a magnet of a magnet magnetometer pair or a magnetometer of a magnet magnetometer pair. While this increases the complexity of routing signal busses to each magnetometer, it does provide increased granularity of measurement to detect even more deformed shapes. In other embodiments, to simplify manufacture, only a few magnet magnetometer pairs will be included in a deformable electronic device. Illustrating by example, in an explanatory embodiment used for illustrative purposes below, only three magnet magnetometer pairs are included in a deformable electronic device. Other configurations and/or numbers of magnet magnetometer pairs suitable for use in a deformable electronic device will be obvious to those of ordinary skill in the art having the benefit of this disclosure.

As noted above, since the deformable electronic device can change form factors dynamically while in operation, embodiments of the disclosure contemplate that the visible area of the flexible display available to a user can change while content is actively, and dynamically, being presented. Illustrating by example, if the deformable electronic device is flat, the entire area of the flexible display may be visible. By contrast, if the deformable electronic device is folded in half, only half of the available area of the flexible display will be visible, and so forth.

One or more processors of the one or more electronic circuit components can dynamically adjust the content presentation on the deformable electronic device as a function of the geometric configuration of that deformable electronic device. Thus, if a user is playing a game when the deformable electronic device is flat, the game may appear on the entirety of the flexible display. If the user then bends the deformable electronic device to a tent lean back shape so as to allow the deformable electronic device to rest on a surface, embodiments of the disclosure allow the one or more processors to dynamically and seamlessly, cause the game to morph to adjust the visible area available on the deformable electronic device after the deformable electronic device is deformed.

Turning now to FIG. 1, illustrated therein is one explanatory deformable electronic device 100 configured in accordance with one or more embodiments of the disclosure. The deformable electronic device 100 of FIG. 1 is a portable electronic device. In one or more embodiments, the deformable electronic device 100 includes a deformable link assembly 101 comprising a plurality of linkage members. In one or more embodiments, each linkage member includes a corresponding pivot member 103 that allow the deformable electronic device 100 to be selectively deformed by bending or folding. Advantageously, this allows the deformable electronic device 100 to function as an equivalent to multiple devices depending upon the amount of deformation of the deformable link assembly 101.

For example, the deformable electronic device 100 is shown in an undeformed configuration in which the deformable electronic device 100 is generally flat and substantially planar in FIG. 1. In such a configuration, the deformable electronic device 100 can function as a smartphone, palmtop computer, or tablet computer. However, as will be shown below with reference to FIG. 3, in another embodiment the deformable electronic device 100 can be folded into a tent shape, in a pad orientation, and can accordingly function as a table clock, content viewer, or auxiliary display when such a condition. It should be obvious to those of ordinary skill in the art having the benefit of this disclosure that the deformable electronic device 100 can function as other devices as a function of its physical geometry, including as a gaming device, a media player, or other device.

This illustrative deformable electronic device 100 includes a display 102, which may optionally be touch-sensitive. In one embodiment where the display 102 is touch-sensitive, the display 102 can serve as a primary user interface of the deformable electronic device 100. Users can deliver user input to the display 102 of such an embodiment by delivering touch input from a finger, stylus, or other objects disposed proximately with the display.

In one embodiment, the display 102 is configured as an organic light emitting diode (OLED) display fabricated on a flexible plastic substrate. However, it should be noted that other types of displays would be obvious to those of ordinary skill in the art having the benefit of this disclosure.

In one or more embodiments, an OLED is constructed on flexible plastic substrates can allow the display 102 to become a flexible display 105 in one or more embodiments with various bending radii. For example, some embodiments allow bending radii of between thirty and six hundred millimeters to provide a bendable display. Other substrates allow bending radii of around five millimeters to provide a display that is foldable through active bending. Other flexible displays 105 can be configured to accommodate both bends and folds. In one or more embodiments the flexible display 105 may be formed from multiple layers of flexible material such as flexible sheets of polymer or other materials.

The explanatory deformable electronic device 100 of FIG. 1 also includes a deformable link assembly 101 comprised of a plurality of linkage members. In one or more embodiments, each linkage member includes one or more pivot members 103. Explanatory operation of one or more embodiments of the deformable link assembly 101 is described in commonly assigned U.S. patent application Ser. No. 18/213,679, filed Jun. 23, 2023, entitled "Deformable Electronic Devices and Methods for Constructing the Same," which is incorporated by reference herein for all purposes.

The pivot members 103, which each include a pivot shaft having its central axis aligned substantially parallel with the surface defined by the display 102, and which each engage a plurality of links that are interleaved in an overlapping arrangement, allow portions of the deformable link assembly 101 to pivot about each linkage member so that the deformable electronic device 100 becomes bendable and/or foldable.

In one or more embodiments, a flexible substrate is situated beneath the display 102. In one or more embodiments, the flexible substrate provides intermediary support structure between the display 102 and the deformable link assembly 101.

In the illustrative embodiment of FIG. 1, the display 102 abuts a major surface of the flexible substrate on an opposite side of the flexible substrate relative to the deformable link assembly 101. In one embodiment, the lower surface of the display 102, or another layer in the mechanical stack-up of the display 102, can be adhered to the flexible substrate on one side of the flexible substrate while the deformable link assembly 101, or alternatively to portions of the deformable link assembly 101, are adhered to the other side of the flexible substrate. In this illustrative embodiment, the display 102 also spans the pivot members 103 of each linkage member. In this illustrative embodiment, the display 102 is flexible so as to deform when the deformable link assembly 101 bends around the pivot members 103.

Features can be incorporated into the deformable electronic device 100. Examples of such features include an optional image capture device 104 or an optional speaker port 129. A user interface component, which may be a button or touch sensitive surface, can also be disposed along a side of an electronic circuit component housing 106. The deformable electronic device 100 can also include one or more connectors 107, which can be an analog connector, a digital connector, or combinations thereof.

A block diagram schematic 110 of the deformable electronic device 100 is also shown in FIG. 1. The block diagram schematic 110 can be configured as a printed circuit board assembly disposed within the electronic circuit component housing 106. Various components can be electrically coupled together by conductors, or a bus disposed along one or more printed circuit boards. A flexible substrate can then span the pivot members 103 to electrically couple electronic circuits situated in the electronic circuit component housing 106 to other components situated within another electronic circuit component housing 127, wherein included, together.

In one or more embodiments, the deformable electronic device 100 includes one or more processors 112. In one embodiment, the one or more processors 112 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the deformable electronic device 100. Each of the application processor and the auxiliary processor(s) can be configured to process and execute executable software code to perform the various functions of the deformable electronic device 100. A storage device, such as memory 113, can optionally store the executable software code used by the one or more processors 112 during operation.

In this illustrative embodiment, the deformable electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11, and other forms of wireless communication such as infrared technology. The communication circuit 114 can include wireless communication circuitry, one of a receiver, a transmitter, or transceiver, and one or more antennas 115.

In one embodiment, the one or more processors 112 can be responsible for performing the primary functions of the deformable electronic device 100. For example, in one embodiment the one or more processors 112 comprise one or more circuits operable with one or more user interface devices, which can include the display 102, to present, images, video, or other presentation information to a user. The executable software code used by the one or more processors 112 can be configured as one or more modules 116 that are operable with the one or more processors 112. Such modules 116 can store instructions, control algorithms, logic steps, and so forth.

In one embodiment, the one or more processors 112 are responsible for running the operating system environment of the deformable electronic device 100. The operating system environment can include a kernel and one or more drivers, and an application service layer, and an application layer. The operating system environment can be configured as executable code operating on one or more processors or control circuits of the deformable electronic device 100. The application layer can be responsible for executing application service modules. The application service modules may support one or more applications or "apps." The applications of the application layer can be configured as clients of the application service layer to communicate with services through application program interfaces (APIs), messages, events, or other inter-process communication interfaces. Where auxiliary processors are used, they can be used to execute input/output functions, actuate user feedback devices, and so forth.

In one embodiment, the deformable electronic device 100 optionally includes one or more magnet magnetometer pairs 120, operable with the one or more processors 112, to detect a bending operation that causes the deformable link assembly 101 to deform, thereby transforming the deformable electronic device 100 into a deformed geometry, such as that shown in FIGS. 2-7. In one or more embodiments, each magnet magnetometer pair 120 is situated in a linkage member of the plurality of linkage members defining the deformable link assembly 101 such that the magnetometer of each magnet magnetometer pair 120 is situated in a linkage member of the plurality of linkage members and at least one corresponding magnet is situated in another linkage member of the plurality of linkage members that is adjacent to the linkage member in which the magnetometer is situated.

Illustrating by example, if a magnet of one magnet magnetometer pair 120 is situated in linkage member 126, at least one corresponding magnet may be situated in linkage member 128, which is adjacent to linkage member 126. This adjacent positioning of the magnetometer and corresponding magnet of each magnet magnetometer pair 120 allows the one or more processors 112 to identify a deformed shape of the deformable electronic device 100 from signals received from the magnetometers of the magnet magnetometer pairs 120.

In the illustrative embodiment of FIG. 1, the magnet magnetometer pairs 120 comprise at least three magnet magnetometer pairs. Moreover, as will be illustrated and described below with reference to FIGS. 15-17, in one or more embodiments each magnet magnetometer pair is separated from each other magnet magnetometer pair by at least one linkage member of the plurality of linkage members defining the deformable link assembly 101. However, more magnet magnetometer pairs 120 can be added as well. For instance, in other embodiments, examples of which will be described below with reference to FIGS. 20-21, every linkage member of the deformable link assembly 101 can include either a magnet or a magnetometer of a magnet magnetometer pair 120. Thus, it should be understood that embodiments of the disclosure can have as few as one magnet magnetometer pair 120 or as many as the number of linkage members.

In the illustrative embodiment of FIG. 1, the plurality of linkage members defining the deformable link assembly 101 comprises at least fifteen linkage members. Like the number of magnet magnetometer pairs 120, this number can vary as well. Increasing the number of linkage members allows for tighter bending radii, while decreasing the number of linkage members simplifies the design and reduces the part count necessary to construct the deformable electronic device 100.

As will be illustrated below with reference to FIG. 8, in one or more embodiments at least some of the linkage members of the plurality of linkage members defining the deformable link assembly 101 house one or more rechargeable electrochemical cells. In the illustrative embodiment of FIG. 1, each linkage member of the plurality of linkage members defining the deformable link assembly 101 houses a rechargeable electrochemical cell pair.

In one or more embodiments, the magnetometer of odd instances of the linkage members housing the rechargeable electrochemical cell pairs is situated between a first pair of rechargeable electrochemical cells situated within the odd instances of the linkage members housing the rechargeable electrochemical cell pairs. The corresponding magnets of the magnet magnetometer pair 120 of even instances of the linkage members housing the rechargeable electrochemical cell pairs is then situated between a second pair of rechargeable electrochemical cells situated within the even instances of the linkage members housing the rechargeable electrochemical cell pairs. This "between the cells" positioning of the magnet or magnetometer of each magnet magnetometer pair 120 allows for the determination of a wide range of deformable shapes while using only a small number of magnet magnetometer pairs 120. However, in other embodiments, examples of which are described below with reference to FIGS. 20-21, either the magnetometers or magnets can be situated outside the rechargeable electrochemical cell pairs as well. Other configurations will be obvious to those of ordinary skill in the art having the benefit of this disclosure.

Accelerometers 125 can be used in conjunction with the magnet magnetometer pairs 120. Illustrating by example, a first accelerometer can be positioned in the electronic circuit component housing 106, while a second accelerometer is situated within another electronic circuit component housing 127. In this illustrative embodiment, the electronic circuit component housing 106 is situated to one side of the plurality of linkage members defining the deformable link assembly 101, while the other electronic circuit component housing 127 is situated to another side of the plurality of linkage members defining the deformable link assembly 101.

In one or more embodiments, the one or more processors 112 can use the magnet magnetometer pairs 120 to detect a deformed or undeformed state of the deformable electronic device 100 and can then use the accelerometers 125 to distinguish orientations of those shapes.

Illustrating by example, in one or more embodiments the one or more processors 112 are configured to distinguish between the L pad shape and the L stand shape, or alternatively between the tent pad shape and the tent lean back shape, using signals received from the first accelerometer and the second accelerometer. Techniques for doing this will be described below with reference to FIG. 18. Others will be obvious to those of ordinary skill in the art having the benefit of this disclosure.

In one embodiment, the one or more processors 112 may generate commands or execute control operations based on information received from the various sensors, including the one or more magnet magnetometer pairs 120, the accelerometers 125, the user interface, or the other sensors 121. The one or more processors 112 may also generate commands or execute control operations based upon information received from a combination of the one or more magnet magnetometer pairs 120, the accelerometers 125, the user interface, or the other sensors 121. Alternatively, the one or more processors 112 can generate commands or execute control operations based upon information received from the one or more magnet magnetometer pairs 120 and the accelerometers 125 alone. Moreover, the one or more processors 112 may process the received information alone or in combination with other data, such as the information stored in the memory 113.

The one or more other sensors 121 may include a microphone, an earpiece speaker, a second loudspeaker, and a user interface component such as a button or touch-sensitive surface. The one or more other sensors 121 may include one or more of an accelerometer, gyroscope, image capture device, and/or display touch sensors to determine whether the deformable electronic device 100 is being held by a first side or a second side side in a portrait mode.

The one or more other sensors 121 may also include key selection sensors, proximity sensors, a touch pad sensor, a touch screen sensor, a capacitive touch sensor, and one or more switches. Touch sensors may be used to indicate whether any of the user actuation targets present on the display 102 are being actuated. Alternatively, touch sensors disposed in the deformable electronic device 100 can be used to determine whether the deformable electronic device 100 is being touched at side edges or major faces of the deformable link assembly 101. The touch sensors can include surface and/or housing capacitive sensors in one embodiment. The other sensors 121 can also include audio sensors and video sensors (such as a camera).

The other sensors 121 can also include motion detectors, such as one or more accelerometers or gyroscopes. For example, an accelerometer may be embedded in the electronic circuitry of the deformable electronic device 100 to show vertical orientation, constant tilt and/or whether the deformable electronic device 100 is stationary. A gyroscope can be used in a similar fashion.

Other components 122 operable with the one or more processors 112 can include output components such as video outputs, audio outputs, and/or mechanical outputs. Examples of output components include audio outputs such as speaker port 129, earpiece speaker, or other alarms and/or buzzers and/or a mechanical output component such as vibrating or motion-based mechanisms. Still other components will be obvious to those of ordinary skill in the art having the benefit of this disclosure.

In one or more embodiments, the deformable electronic device 100 comprises a plurality of energy storage devices 123. In one or more embodiments, each energy storage device of the plurality of energy storage devices 123 comprises a rechargeable electrochemical cell. In one or more embodiments, as will be explained in more detail below with reference to FIG. 8, the plurality of energy storage devices

123 include a pair of energy storage devices situated in each linkage member of the plurality of linkage members defining the deformable link assembly 101.

In one or more embodiments, each pair of energy storage devices of the plurality of energy storage devices 123 situates in a corresponding linkage member on a one-to-one basis, with a pair of energy storge devices 123 situated within a corresponding linkage member. In other embodiments, a single energy storage device of the plurality of energy storage devices 123 situates in a corresponding linkage member on a one-to-one basis. In still other embodiments, only some of the linkage members of the plurality of linkage members defining the deformable link assembly 101 will house energy storage devices. Other configurations will be obvious to those of ordinary skill in the art having the benefit of this disclosure.

In the illustrative embodiment of FIG. 1, the plurality of energy storage devices 123 are situated on a rear side of the flexible substrate supporting the display 102. In this example, the plurality of energy storage devices 123 are situated between the electronic circuit component housing 106 to other components situated within another electronic circuit component housing 127. In one or more embodiments, each pair of energy storage devices of the plurality of energy storage devices 123 substantially spans a width of the deformable electronic device. This will be shown in more detail below with reference to FIG. 8.

Each energy storage device of the plurality of energy storage devices 123 can take a variety of forms. In an illustrative embodiment, each energy storage device of the plurality of energy storage devices 123 can comprise an electrochemical cell, which is optionally rechargeable. For instance, the plurality of energy storage devices 123 can each comprise a lithium-ion, lithium-polymer, or other type of rechargeable cell. Other examples of energy storage devices suitable for use with embodiments of the disclosure will be obvious to those of ordinary skill in the art having the benefit of this disclosure. For instance, in other embodiments the plurality of energy storage devices 123 may be a supercapacitor, and so forth.

In one or more embodiments, a first pair of energy storage devices is situated in a first linkage member, with a second pair of energy storages device situated in a second linkage member, and so forth. In one or more embodiments, an electrical conductor couples the energy storage devices of the plurality of energy storage devices 123 together and/or to the one or more processors 112.

Charging circuitry 124 can be included to selectively individual, subsets, or all of the plurality of energy storage devices 123 when depleted. In one or more embodiments, the charging circuitry 124 comprises a charging node that is coupled to each energy storage device of the plurality of energy storage devices 123.

In one or more embodiments, the charging circuitry 124 includes a switch that is electrically coupled between the conductor coupling the plurality of energy storage devices 123. Opening the switch disconnects the conductor from the plurality of energy storage devices 123, while closing the switch couples the plurality of energy storage devices 123 to the components of the block diagram schematic 110.

It is to be understood that FIG. 1 is provided for illustrative purposes only and for illustrating components of one deformable electronic device 100 in accordance with embodiments of the disclosure and is not intended to be a complete schematic diagram of the various components required for an electronic device. Therefore, other deformable electronic devices in accordance with embodiments of the disclosure may include various other components not shown in FIG. 1 or may include a combination of two or more components or a division of a particular component into two or more separate components, and still be within the scope of the present disclosure.

A user can perform a bending operation upon the deformable electronic device 100. For example, a user can apply force at the first end 108 and the second end 109 of the deformable electronic device 100 to pivot linkage members of the deformable link assembly 101 relative to other linkage members of the deformable link assembly 101. This method of deforming the deformable link assembly 101 allows the user to simply and quickly bend the deformable electronic device 100 into a desired shape. Examples of common shapes include an L shape, a tent shape, a hook shape, and a wrap shape. Others will be obvious to those of ordinary skill in the art having the benefit of this disclosure.

In other embodiments, rather than relying upon the manual application of force, the deformable electronic device 100 can include a mechanical actuator to deform the deformable link assembly 101 around the pivot members 103 of each linkage member. For example, a motor or other mechanical actuator can be operable with structural components to deform the deformable link assembly 101 around the pivot members 103 of the linkage members to predetermined angles or geometric alignments in one or more embodiments. The inclusion of a mechanical actuator allows a precise bend angle to be repeatedly achieved without the user having to make adjustments in attempting to achieve the same. However, as the inclusion of a mechanical actuator can increase cost, in other embodiments this component will be omitted.

It should be noted that in one or more embodiments, the display 102 has a compliance coefficient that can be used advantageously to help counter the bending operation. Illustrating by example, when the bending operation transforms the deformable electronic device 100 to a bent configuration, one example of which is shown below with reference to FIG. 3, in one or more embodiments the mechanical layers of the display 102 are loaded by the bending operation and work to bias portions of the deformable link assembly 101 back to the open position of FIG. 1.

Moreover, in one or more embodiments a thin stainless-steel plate (approximately 0.04 millimeters in thickness) forms one layer of the display 102 and will increase the loading. This mechanical loading of the layers of the display 102 can be used to help the user transform the deformable electronic device 100 from folded or partially folded configurations to unfolded configurations in one or more embodiments. The modulus of the display 102 can range from 40-300 giga-Pascals in one or more embodiments.

Regardless of whether the bending operation is a manual one or is instead one performed by a mechanical actuator, it results in the display 102 being deformed by one or more bends about the linkage members. Turning now to FIGS. 2-7, illustrated therein are three illustrative results of bending operations.

Figures 2, 3, 4:
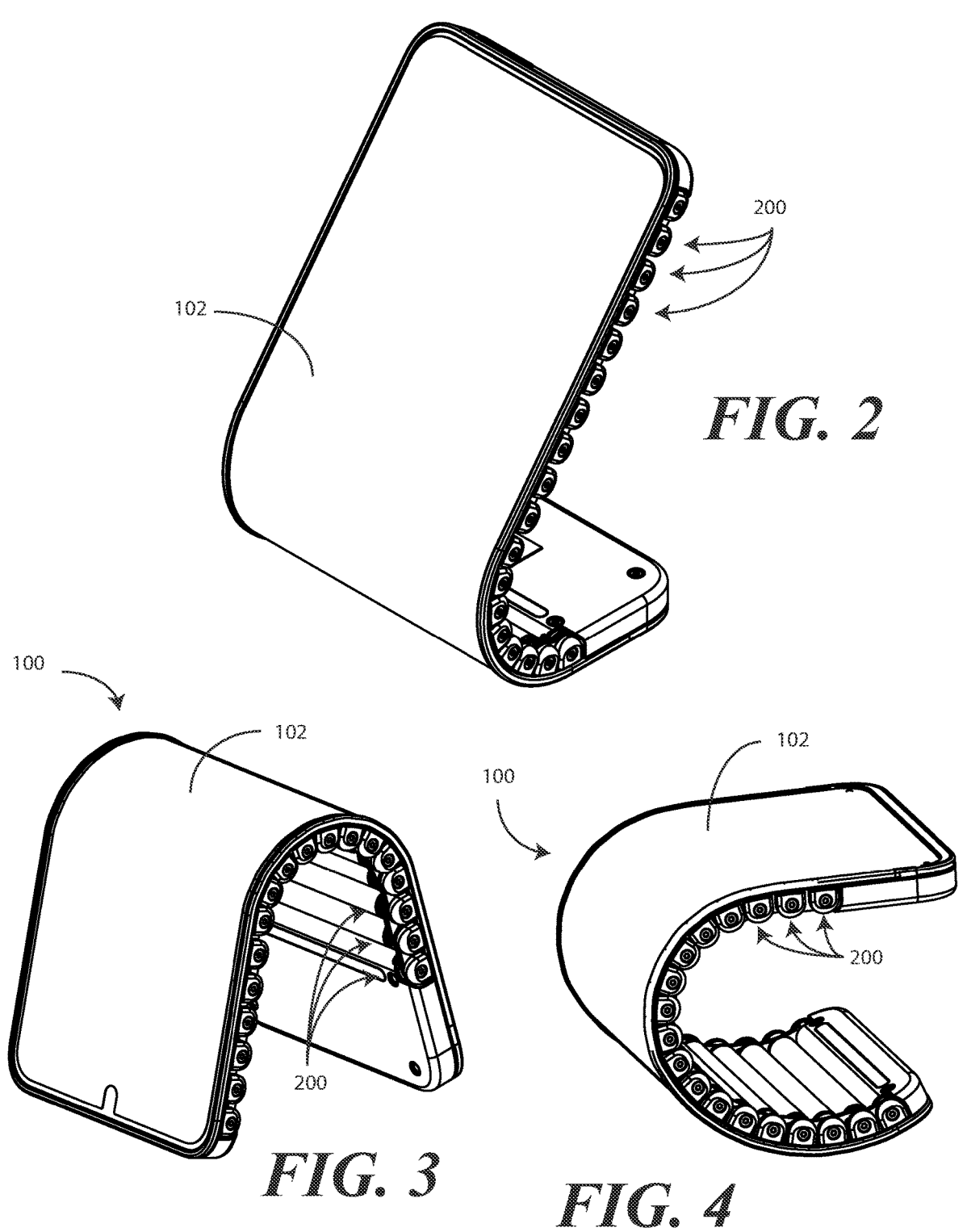
FIG. 2 illustrates one explanatory deformable electronic device in accordance with one or more embodiments of the disclosure when in a deformed to a "L stand" shape.
FIG. 3 illustrates one explanatory deformable electronic device in accordance with one or more embodiments of the disclosure when in a deformed to a "tent pad" shape.
FIG. 4 illustrates one explanatory deformable electronic device in accordance with one or more embodiments of the disclosure when in a deformed to a "wrap" shape.

In the illustrative embodiment of FIG. 2, the deformable electronic device 100 has been deformed into an L shape. Additionally, the L shape has been placed on a table or other flat surface such that the minor planar surface of display 102 defining the "L" abuts the surface. This is known as a "L stand" shape, with the deformable electronic device 100 having a single bend. This bent configuration can make the display 102 easier for the user to view since they do not have to hold the deformable electronic device 100 in their hands.

In this illustrative embodiment, the display 102 has a single bend about the linkage members 200. However, in other embodiments, the display 102 can be deformed with a plurality of bends about the linkage members 200. Other configurations will be obvious to those of ordinary skill in the art having the benefit of this disclosure.

In one embodiment, the one or more processors (112) of the deformable electronic device 100 are operable to detect that a bending operation is occurring from signals from the magnetometers of the magnet magnetometer pairs (120). Said differently, in one or more embodiments the one or more processors (112) are configured to determine whether the deformable electronic device 100 is deformed, and into what shape, from signals from the magnetometers of the magnet magnetometer pairs (120). This can be done in conjunction with other signals from the accelerometers (125).

Figures 5, 6, 7:
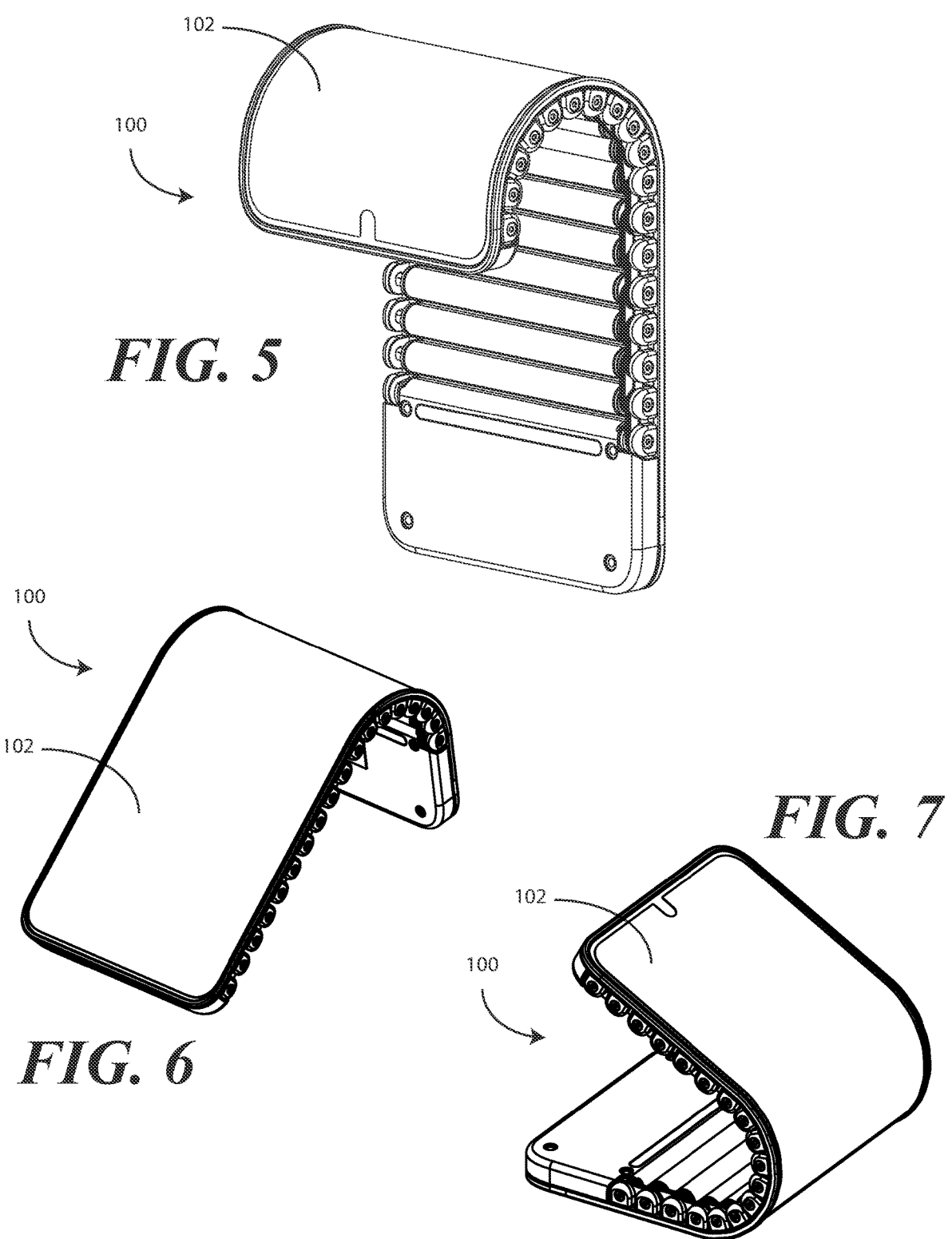
FIG. 5 illustrates one explanatory deformable electronic device in accordance with one or more embodiments of the disclosure when in a deformed to a "hook" shape.
FIG. 6 illustrates one explanatory deformable electronic device in accordance with one or more embodiments of the disclosure when in a deformed to a "L pad" shape.
FIG. 7 illustrates one explanatory deformable electronic device in accordance with one or more embodiments of the disclosure when in a deformed to a "tent lean back" shape.

Where, for instance, the deformable electronic device 100 comprises a first accelerometer situated to one side of the plurality of linkage members and a second accelerometer situated to a second side of the plurality of linkage members, the one or more processors (112) are configured to determine, when the deformable electronic device 100 is deformed as shown in FIG. 2, whether the deformable electronic device 100 is in a pad orientation (the deformable electronic device 100 is shown in a L pad shape in FIG. 6), a stand orientation, or, in the case of tent folds such as that shown in FIG. 3, whether the deformable electronic device 100 is in a tent pad orientation (shown in FIG. 3) or a tent lean back orientation (the deformable electronic device 100 is shown in a tent lean back shape in FIG. 7). Techniques for doing this are further described below with reference to FIG. 18.

In FIG. 2, the one or more processors (112) are operable to determine the deformable electronic device 100 is in a L stand configuration from signals from the magnet magnetometer pair (120) and other signals from the accelerometers (125). The one or more processors (112) can detect other shapes of the deformable electronic device 100 as well, one example of which is the hook shape shown in FIG. 5.

In one or more embodiments, the one or more processors (112) can partition the display 102 of the deformable electronic device 100 as another function of the geometric alignment of the deformable link assembly (101) resulting from the bending operation. For example, in the illustrative embodiment of FIG. 2 the display 102 has been partitioned into a first portion that is visible and a second portion (facing into the surface upon which the deformable electronic device 100 rests), with each portion being disposed on opposite sides of the stand bend. In one or more embodiments, the one or more processors (112) can detect a bend amount as well using the magnet magnetometer pairs (120) and/or accelerometers (125).

In one or more embodiments, the one or more processors (112) of the electronic device are operable to, when the display 102 is deformed by one or more bends, present a first image on a first portion of the display 102, while presenting a second image on a second portion of the display 102. If, for example, the deformable electronic device 100 were turned such that the first end (108) and the second end (109) were resting on the surface, which is known as a "pad" orientation, and which is shown in FIG. 6, the deformable electronic device 100 would resemble an offset tent with a first portion of the display 102 visible from a first side of the bend and a second portion of the display 102 visible from a second side of the bend.

When the bend is made in the middle, rather than in an offset location such as that shown in FIG. 2, the L shape transforms to a "tent" shape. One example of such a tent shape is shown in FIG. 3. As shown in FIG. 3, the deformable electronic device 100 has been bent further to resemble a playing card bent into a "tent" configuration. The tent configuration of FIG. 3 is in a "pad" orientation because the first end (108) and the second end (109) of the deformable electronic device 100 are resting on a surface. This "tent pad" shape makes the display 102 easier to see from above.

FIG. 4 illustrates the deformable electronic device 100 when deformed into a "wrap" shape. When in the wrapped configuration, the deformable electronic device 100 can even be worn on a wrist. The wrap shape can be configured with different radii to accommodate different size wrists. In one or more embodiments, the deformable electronic device 100 can be deformed into at least six different wrap shapes, each having a smaller radius than the one before to accommodate smaller and smaller wrists.

In one or more embodiments, the plurality of linkage members 200 define a multi-link hinging mechanism for the deformable electronic device 100. In FIGS. 1-7 the linkage members 200 are all similarly configured with links separating each pivot member (103) from another. The linkage members 200 defining the deformable link assembly 101 are attached to a rear major face of the flexible substrate supporting the display 102.

Figure 8:
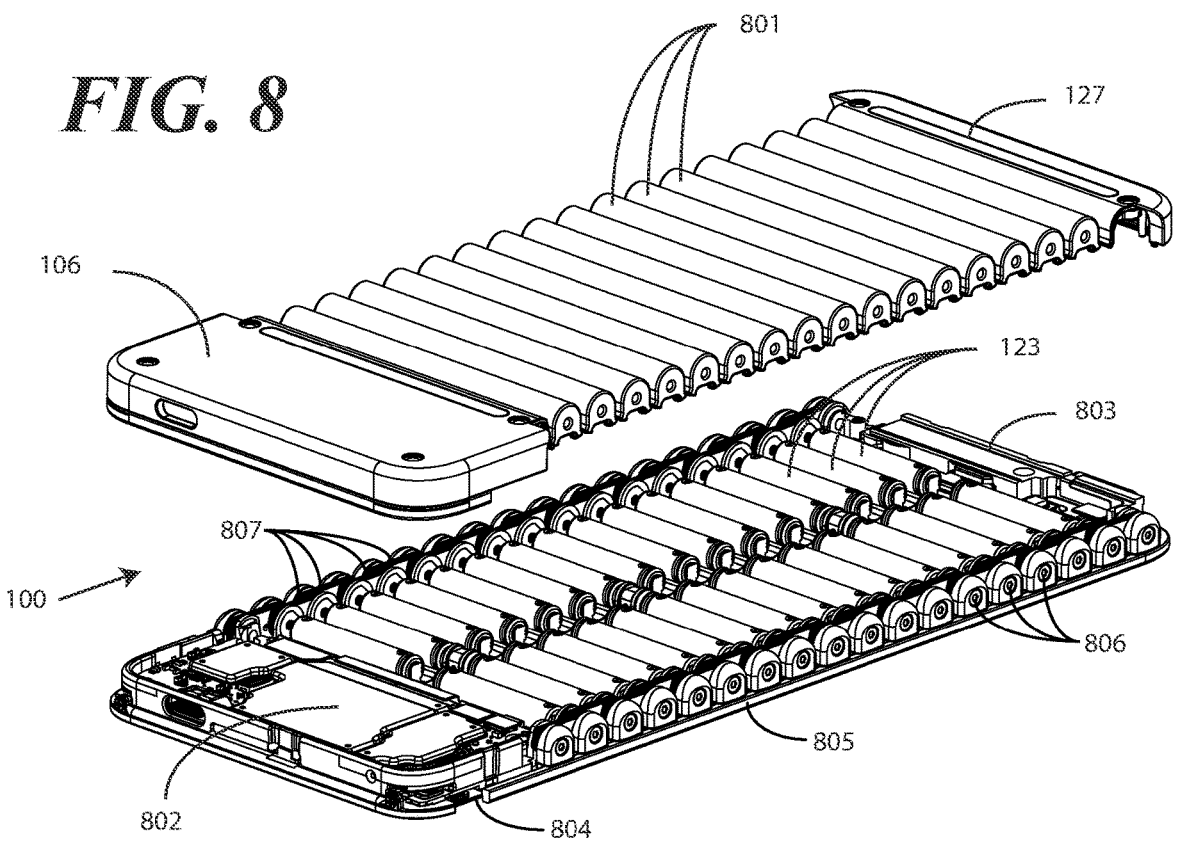
FIG. 8 illustrates an exploded view of a partial deformable electronic device assembly in accordance with one or more embodiments of the disclosure.

Turning now to FIG. 8, illustrated therein is the deformable electronic device 100 of FIGS. 1-7 in a partially assembled state. In one or more embodiments each linkage member (200) comprises a pivot shaft. In the illustrative embodiment of FIG. 8, each linkage member (200) has a pair of pivot shafts extending distally in opposite directions from the ends of each linkage member (200). The pivot shafts of FIG. 8 engage one or more screws 806, which retain links 807 that engage the pivot shafts between the stanchions from which the pivot shafts extend and covers held against the ends of the pivot shafts by those screws 806.

The links 807 engaging each pivot shaft can be configured with mechanical features that provide drive functions, resistance functions, stage stop functions, and other functions that alter the way that the deformable electronic device 100 deforms. Illustrating by example, each link 807 can define a pivoting aperture within which each pivot shaft of the plurality of pivot shafts can rotate without translation and a sliding aperture within which each pivot shaft of the plurality of pivot shafts can both rotate and translate when the deformable electronic device 100 deforms.

In one or more embodiments, the linkage members (200) house, or are collocated with, mechanical components that provide one or more different mechanical functions for the deformable electronic device 100. Illustrating by example, the mechanical components can provide mechanical support for both the flexible substrate 804 mechanically coupled to the display (102) and the display (102) itself when the deformable electronic device 100 is planar in the undeformed shape shown above in FIG. 8. Moreover, when the deformable electronic device 100 is in one of the deformed shapes shown in FIGS. 2-7, the pivot shafts of each linkage member (200) can move together to provide full support for the underside major surface of flexible substrate 804 supporting the display (102).

In one or more embodiments, the pivot members (103) of each linkage member (200) are not only operable to facilitate bending of the deformable electronic device 100 but also to change the distance between electronic circuit components 802 situated in the electronic circuit component housing 106 and other electronic circuit components 803 situated within another electronic circuit component housing 127. Embodiments of the disclosure contemplate that for optimal bending of the display (102), it can be advantageous for the overall length of the deformable electronic device 100 to change during bending operations.

In one or more embodiments, when the electronic device 100 bends it effectively shortens in length due to the fact that pivot members (103) move toward one another at the bending locations of the electronic device 100. Meanwhile, the display (102), as well as the flexible substrate 804 supporting the display (102), remain an effectively constant length regardless of the shape of the electronic device 100. Since stainless steel cannot stretch, the display (102) remains a constant length despite the fact that some of the pivot members 103 may move closer together at bend locations.

In one or more embodiments, one or more rechargeable energy storage devices 123 are positioned between the plurality of pivot shafts extending distally from the sides of each linkage member (200) that engage with interleaved links to provide deformability for the deformable electronic device 100. In one or more embodiments, each energy storage device 123 comprises a rechargeable electrochemical cell.

In one or more embodiments, the rechargeable electrochemical cells include a positive electrode (cathode), a negative electrode (anode), and a separator that prevents these two electrodes from touching. While a separator electrically separates the cathode and anode, the separator permits ions to pass through.

In one or more embodiments, a separator having a top and bottom is placed atop an electrode. Disposed on the top of the separator is a first layer of an electrochemically active material. For example, the first layer may be lithium or a lithium intercalation material if the rechargeable electrochemical cells are lithium ion or lithium polymer cells.

Disposed atop first layer is a current collecting layer. The current collecting layer may be fabricated of any number of metals or alloys known in the art. Examples of such metals or alloys include, for example, nickel, aluminum, copper, steel, nickel plated steel, magnesium doped aluminum, and so forth. Disposed atop the current collection layer is a second layer of electrochemically active material.

The rechargeable electrochemical cells store and deliver energy by transferring ions between electrodes through a separator. For example, during discharge, an electrochemical reaction occurs between electrodes. This electrochemical reaction results in ion transfer through the separator, which causes electrons to collect at the negative terminal of the cell. When connected to a load, such as the electronic components of the block diagram schematic (110) of FIG. 1, the electrons flow from the negative pole through the circuitry in the load to the positive terminal of the cell. This is shown in conventional circuit diagrams as current flowing from the cathode to the anode. When the rechargeable electrochemical cells are charged, the opposite process occurs.

In this illustrative embodiment, each linkage member (200) comprises a pair of energy storage devices 123 situated side-by-side. In other embodiments, only some of the linkage members (200) comprise the energy storage devices 123. As shown, in this illustrative embodiment the plurality of energy storage devices 123 is situated along a second major surface of the deformable electronic device 100, which is on the opposite side of the deformable electronic device 100 from the display (102).

In one or more embodiments, a plurality of covers 801 are included. In one or more embodiments, each cover of the plurality of covers 801 covers the one or more energy storage devices 123 situated between pairs of pivot shafts of each linkage member (200) of the deformable link assembly (101) atop corresponding brackets supporting each pair of stanchions from which the pivot shafts extend to encage links of the plurality of linkage members (200). In one or more embodiments, the covers of the plurality of covers 801 do this without touching neighboring covers when the deformable electronic device 100 is in the substantially planar state shown in FIG. 8. One or more screws 806 can retain the deformable electronic device 100 together once the links 807 engage the pivot shafts of each linkage member (200).

In other embodiments, the plurality of covers 801 could be replaced by a housing subassembly comprising both rigid and flexible materials, with a flexible material interconnecting together each cover of the plurality of covers 801, the electronic circuit component housing 106, and the other electronic circuit component housing 127. In one or more embodiments, a fabric or elastomer can be used as the flexible material. The flexible material could connect from underneath the electronic circuit component housing 106 and the other electronic circuit component housing 127 whereby it serves to cosmetically close the gaps between the rigid housings and prevent particle ingress. In other embodiments, the flexible material could connect any rigid housings from the outside, with the flexible material being the primary exterior cosmetic surface. This latter embodiment creates a more contiguous appearance across the back of the deformable electronic device 100.

In one or more embodiments, a flexible substrate 804 supports the plurality of pivot shafts of each linkage member (200) and the flexible display (102) of the deformable electronic device 100. In one or more embodiments, the flexible substrate 804 comprises a layer of steel. In one or more embodiments, the flexible substrate 804 comprises a steel layer with a thickness of about one hundred microns. In another embodiment, the flexible substrate 804 is manufactured from a thin, flexible thermoplastic sheet. Other materials can be used in manufacturing the flexible substrate 804 as well. For example, the material nitinol, which is a nickel-titanium alloy, can be used to manufacture the flexible substrate 804. Other flexible, substantially planar materials will be obvious to those of ordinary skill in the art having the benefit of this disclosure.

In one or more embodiments, the flexible substrate 804 comprises a flexible, substantially flat support layer. The flexible substrate 804 transitions from a substantially planar shape when undeformed to a shape that is deformed by one or more bends when loading forces are applied.

Accordingly, the flexible substrate 804 defines a mechanical support layer for the flexible display of the deformable electronic device 100. In one or more embodiments, the flexible substrate 804 includes a reinforcing border comprising a thicker layer of material, one example of which is silicone, to further protect the flexible display to which the flexible substrate 804 is attached when the corresponding deformable electronic device is in the substantially planar state. In this illustrative embodiment, the flexible substrate 804 comprises a silicone border 805 positioned around a perimeter of the flexible substrate 804 on three sides. In one or more embodiments, the silicone border 805 surrounds and protects the edges of the flexible display to which the flexible substrate 804 is attached. In one or more embodiments, the silicone border 805 is co-molded around the one or more portions of the perimeter of the flexible substrate 804.

In one or more embodiments, the flexible substrate 804 can define one or more apertures. These apertures can be used for a variety of purposes. Illustrating by example, some of the apertures can be used to rigidly fasten the flexible substrate to one or more brackets supporting pairs of stanchions supporting a plurality of pivot shafts engaging an inner group of links and an outer group of links that allow the deformable electronic device 100 into which the flexible substrate 804 is integrated to deform from a substantially planar state to a deformed state.

In one or more embodiments, the flexible display coupled to the flexible substrate 804 situates within the confines of the silicone border 805. In one or more embodiments, the silicone border 805 defines a singular, contiguous, unitary piece of silicone. In the illustrative embodiment of FIG. 8, the silicone border 805 surrounds three sides of the flexible substrate 804 and fails to pass along a minor side that defines a receiving recess that can accommodate mechanical and electrical components such as electronic circuit components to power and control the flexible display that will situate within the perimeter defined by the silicone border 805.

In FIG. 8, pairs energy storage devices 123 have been situated between pairs of stanchions atop the corresponding brackets from which those stanchions extend. Additionally, the electronic circuit components 802,803 have been on either side of these energy storage devices 123. The electronic circuit components 802,803 are coupled to the energy storage devices 123. In some embodiments, the rechargeable electrochemical cells are surrounded by a sheath.

Figure 9:
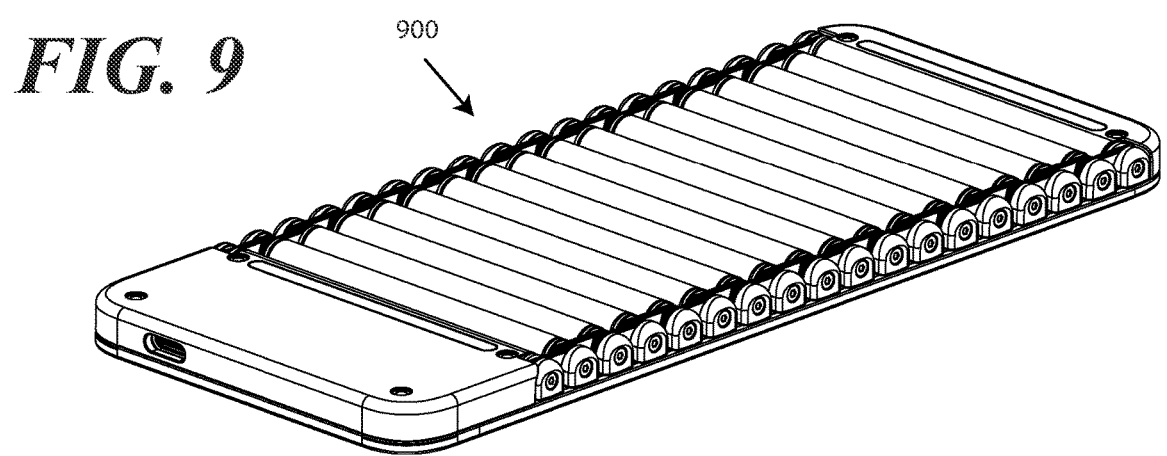
FIG. 9 illustrates a perspective view of one explanatory deformable electronic device in accordance with one or more embodiments of the disclosure.

In one or more embodiments the plurality of covers 801 covers the plurality of energy storage devices 123. In one or more embodiments, each cover of the plurality of covers 801 is physically separated from the other. Accordingly, each cover of the plurality of covers 801 covers the energy storage devices 123 situated between the pairs of stanchions by situating atop a corresponding bracket to cover a pair of energy storage devices 123 without touching a neighboring cover when the assembly is in the substantially planar state. As shown, the electronic circuit component housing 106 covers electronic circuit components 803, while the other electronic circuit component housing 127 covers electronic circuit components 803. The resulting assembly 900 is shown in FIG. 9.

Figures 10, 11, 12, 13:
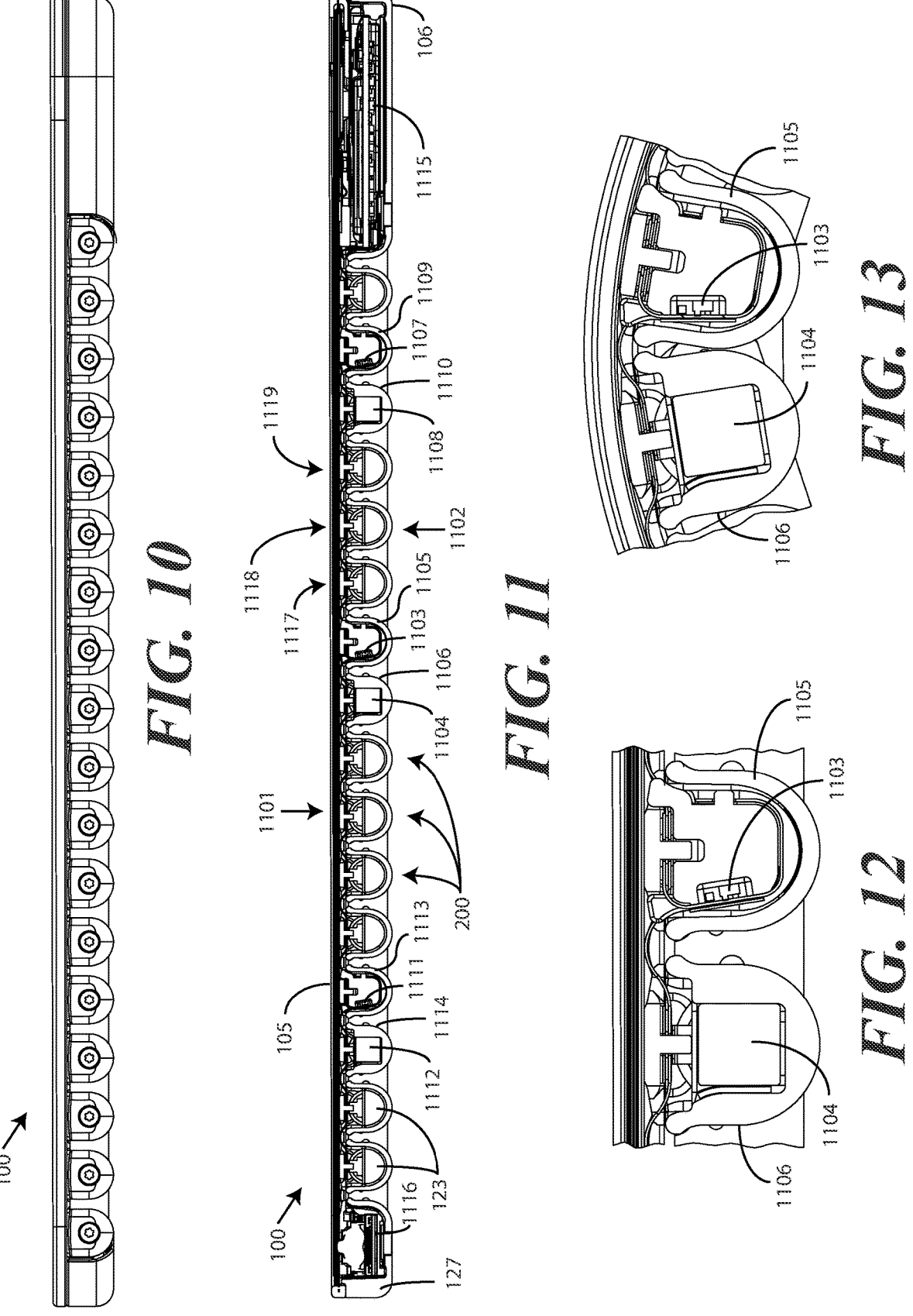
FIG. 10 illustrates a side view of one explanatory deformable electronic device in an undeformed or "flat" shape.
FIG. 11 illustrates a cut-away view of the explanatory deformable electronic device of FIG. 10.
FIG. 12 illustrates a cut-away view of two explanatory linkage members of a deformable electronic device when in an undeformed or flat shape.
FIG. 13 illustrates the cutaway view of FIG. 12 when the deformable electronic device is in a deformed shape.

A side view of the deformable electronic device 100, once assembled, is shown in FIG. 10. A cut-away view of the deformable electronic device 100 is shown in FIG. 11. The cut-away view allows some of the internal components of the linkage members 200, the electronic circuit component housing 106, and the other electronic circuit component housing 127 to be more readily seen.

As shown in FIG. 11, in one or more embodiments the deformable electronic device 100 comprises a flexible display 105 spanning a first major surface 1101 of the deformable electronic device 100. The deformable electronic device 100 also includes the plurality of linkage members 200 situated along a second major surface 1102 of the deformable electronic device 100.

In one or more embodiments, at least some of the linkage members 200 house one or more energy storage device 123. In the illustrative embodiment of FIG. 11, each linkage member 200 comprises a pair of energy storage device 123 as described above with reference to FIG. 8.

As previously described, the deformable electronic device comprises one or more magnet magnetometer pairs (120).

Each magnet magnetometer pair (120) comprises a magnetometer situated in a linkage member and at least one corresponding magnet situated in another linkage member that is adjacent to the linkage member in which the magnetometer is situated. One or more processors (112) of the deformable electronic device 100 are configured to identify a deformed or undeformed shape of the deformable electronic device 100 from signals receives from the one or more magnetometers.

In one or more embodiments, the one or more processors (112) are then configured, upon determining whether the deformable electronic device 100 is in an undeformed shape or a deformed shape, to store the detected shape in the memory (113) until another shape is detected. Illustrating by example, if the one or more processors (112) determine that the deformable electronic device 100 is in the undeformed shape shown in FIG. 11, to store a record of detecting the undeformed shape in the memory (113) until one of the wrap shape of FIG. 4, the L-shape of FIGS. 2 and 6, or the tent shape of FIGS. 3 and 7 is detected.

Illustrating by example, in this illustrative embodiment the deformable electronic device comprises at least a first magnetometer 1103 situated in a first linkage member 1105 and a first magnet 1104 situated in a second linkage member 1106 that is adjacent to the first linkage member 1105. Similarly, the deformable electronic device 100 comprises a second magnetometer 1107 situated in a third linkage member 1109, while a second magnet 1108 is situated in a fourth linkage member 1110 that is adjacent to the third linkage member 1109. In this illustrative embodiment, a third magnetometer 1111 is situated in a fifth linkage member 1113, while a third magnet 1112 is situated in a sixth linkage member 1114 that is adjacent to the fifth linkage member 1113.

Thus, in this illustrative embodiment the deformable electronic device comprises at least three magnet magnetometer pairs (120). In one or more embodiments, the one or more processors (112) of the deformable electronic device 100 are configured to determine whether the deformable electronic device 100 is deformed, and into what shape, from signals from combinations of one or more of the first magnetometer 1103, the second magnetometer 1107, and/or the third magnetometer 1111.

In the illustrative embodiment of FIG. 11, accelerometers are included as well. The inclusion of accelerometers allow the one or more processors (112) to determine not only whether the deformable electronic device 100 is deformed, and into what shape, but whether the deformable electronic device 100 is in a pad orientation (examples of which were shown above in FIGS. 3 and 6), a stand orientation (an example of which was shown above in FIG. 2), or a lean back orientation (an example of which was shown above in FIG. 7) in three-dimensional space.

Illustrating by example, in this illustrative embodiment a first accelerometer 1115 is situated to one side of the plurality of linkage members 200 within the electronic circuit component housing 106 and a second accelerometer 1116 is situated to a second side of the plurality of linkage members 200 within the other electronic circuit component housing 127. The one or more processors (112) are configured to determine, when the deformable electronic device is deformed, whether the deformable electronic device is in a pad orientation, a stand orientation, or a lean back orientation in three-dimensional space from signals from the first accelerometer 1115 and/or other signals from the second accelerometer 1116.

In this illustrative embodiment, each magnet magnetometer pair (120) is separated from each other magnet magnetometer pair (120) by at least one linkage member linkage member of the plurality of linkage members 200. Illustrating by example, the first magnet magnetometer pair defined by the first magnetometer 1103 and the first magnet 1104 is separated from the second magnet magnetometer pair defined by the second magnetometer 1107 and the second magnet 1108 by three linkage members 1117,1118,1119.

Thus, in one or more embodiments at least one linkage member separates the first linkage member 1105 and the second linkage member 1106 from the third linkage member 1109 and the fourth linkage member 1110, while at least one other linkage member separates the first linkage member 1105 and the second linkage member 1106 from the fifth linkage member 1113 and the sixth linkage member 1114. Indeed, in this illustrative embodiment, three linkage members separate the first linkage member 1105 and the second linkage member 1106 from the third linkage member 1109 and the fourth linkage member 1110, while four other linkage members separate the first linkage member 1105 and the second linkage member 1106 from the fifth linkage member 1113 and the sixth linkage member 1114.

As shown in FIG. 11, in one or more embodiments each magnetometer 1103,1107,1111 is situated off-center in its corresponding linkage member 1105,1109,1113. In this illustrative embodiment, each magnetometer 1103,1107,1111 is situated on the left side of its corresponding linkage member 1105,1109,1113 so as to face its corresponding magnet 1104,1108,1112.

In effect, the one or more processors (112) of the deformable electronic device 100 of FIG. 11 use a plurality of magnetometers 1103,1107,1111 and accelerometers 1115, 1116 whose combined readings can be used to determine the shape, e.g., L shape, wrap shape, or tent shape, into which the deformable electronic device 100 is bent, as well as the orientation in three-dimensional space, e.g., stand, pad, or lean back, into which it has been positioned. By determining the shape and "pose" of the deformable electronic device 100, the one or more processors (112) can customize how information is presented on the flexible display 105 accordingly. Advantageously, the use of multiple sensors, whose readings can be combined to determine the shape and pose into which the deformable electronic device 100 has been positioned allows the user interface of the deformable electronic device to be optimized for the presentation of content to a user.

Turning now to FIGS. 12-13, illustrated therein are two linkage members 1105,1106 of the deformable electronic device (100) of FIG. 11 shown when the deformable electronic device (100) is in the undeformed state and a deformed state, respectively. By comparing these figures, it can be seen that when a bending region between these two linkage members 1105,1106 changes from undeformed to deformed, the magnetometer 1103 situated in the first linkage member 1105 and the magnet 1104 situated in the second linkage member 1106 move closer together.

The one or more processors (112) of the deformable electronic device (100) can receive signals from the magnetometer 1103 to determine the magnetic strength and, therefore, the amount of deflection of the bending region between the two linkage members 1105,1106, which corresponds to the overall deformation of the deformable electronic device (100). The one or more processors (112) will detect a weaker magnetic field using the magnetometer 1103 from the magnet 1104 in FIG. 12 when the deformable electronic device (100) is undeformed than in FIG. 13, where the deformable electronic device (100) is fully bent. By placing these magnet magnetometer pairs (120) at different locations along the length of the deformable electronic device (100), and combining readings from the magnetometers 1103,(1107),(1111) of the magnet magnetometer pairs (120), optionally in conjunction with other signals from the accelerometers (1115,1116), the one or more processors (112) can make determinations about how the deformable electronic device (100) is bent.

Figures 14, 15, 16:
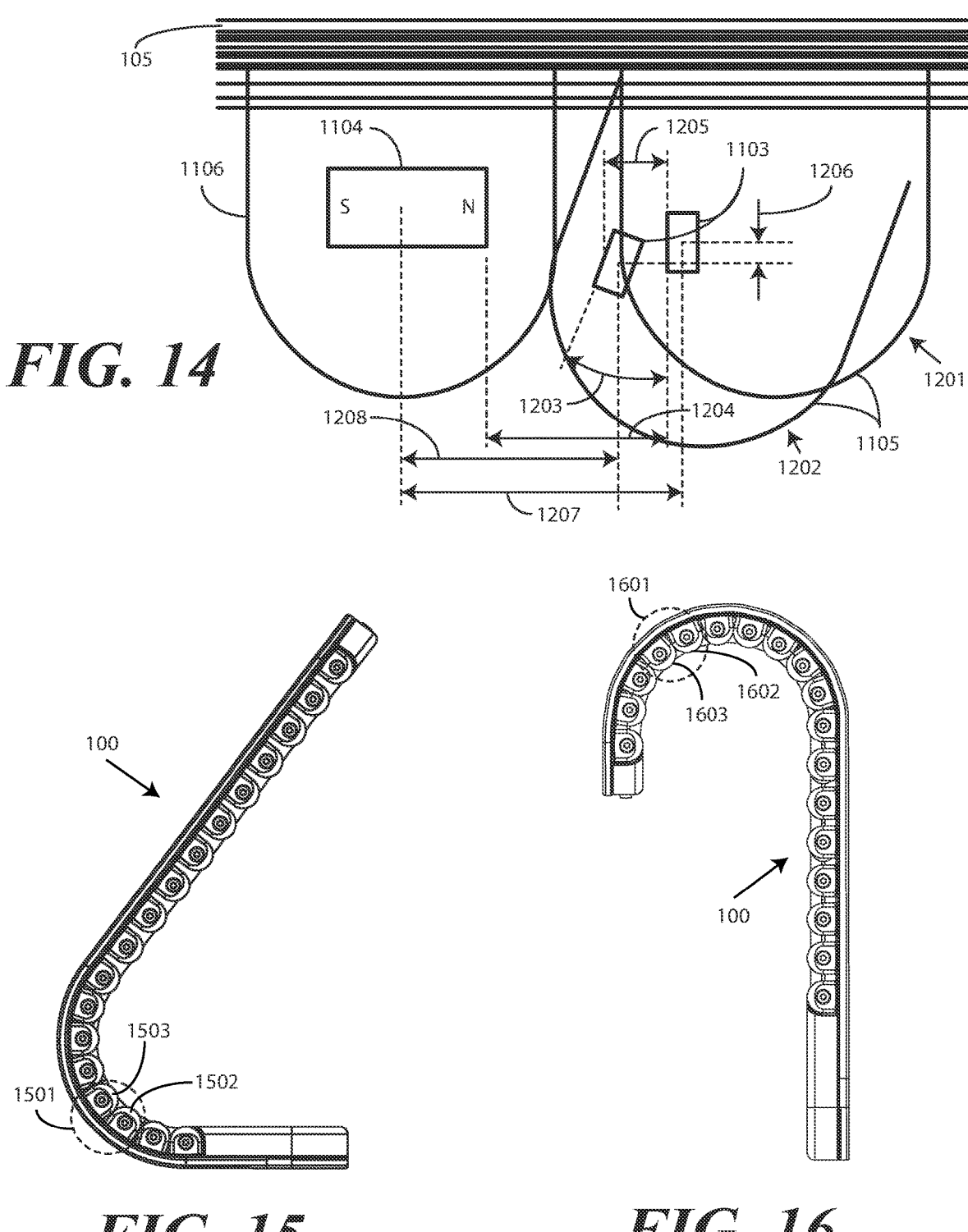
FIG. 14 illustrates one explanatory magnet magnetometer system in accordance with one or more embodiments of the disclosure.
FIG. 15 illustrates one explanatory magnet magnetometer system for detecting deformation of a deformable electronic device to an L shape in accordance with one or more embodiments of the disclosure.
FIG. 16 illustrates one explanatory magnet magnetometer system for detecting deformation of a deformable electronic device to a hook shape in accordance with one or more embodiments of the disclosure.

To illustrate by presentation of some explanatory values, turn now to FIG. 14 where the linkage members 1105,1106 are again shown. Linkage member 1105 is shown at an undeformed position 1201 and a fully deformed position 1202.

When this explanatory deformable electronic device (100) is fully deformed, linkage member 1105 pivots by an angle 1203 of about eighteen degrees. This means that the initial distance 1204 between the magnetometer 1103 and the magnet 1104 that was about 4.24 millimeters is reduced by a translation distance 1205 of about 1.15 millimeters. The center of the magnetometer 1103 drops relative to the flexible display 105 by a distance 1206 of about 0.53 millimeters, while the centers of the magnetometer 1103 and the magnet 1104 transition from an initial distance 1207 of about 6.02 millimeters to a final distance 1208 of about 4.87 millimeters.

When this occurs, the magnetic field sensed by the magnetometer 1103 increases from about twenty-seven milli-Tesla to about fifty-one milli-Tesla, which is well within the maximum range of over one hundred milli-Tesla of magnetometers manufactured by companies such as the Asahi Kasei Microdevices (AKM) corporation. The one or more processors (112) of the deformable electronic device (100) use this change in magnetic field (which is non-linear in one or more embodiments) to determine how much the deformable electronic device (100) is bent.

One question that may come to mind is how many magnet magnetometer pairs (120) to include in a deformable electronic device. While, as will be shown below with reference to FIGS. 20-21, every single linkage member can include a magnetometer, magnet, or both, embodiments of the disclosure contemplate that in many deformable electronic devices this large number of magnet magnetometer pairs (120) is simply overkill that increases cost and circuit complexity (many available magnetometers employ an inter-integrated circuit, or "IIC" or "I2C" bus so they can be individually addressed, which can increase routing complexity when large numbers of magnetometers are used). Moreover, when optimization of the output on the flexible display 105 is a primary result of determining whether a deformable electronic device is bent, and into what shape and orientation, the number of magnet magnetometer pairs (120) can be greatly reduced, thereby reducing cost, processing power requirements, and device complexity.

Embodiments of the disclosure contemplate that in many applications only a limited number of predefined shapes will need to be detected to provide a rich and robust user interface experience. Embodiments of the disclosure contemplate that these include L stand shape, the L pad shape, the tent pad shape, the tent lean back shape, the wrap shape, and optionally the hook shape, all of which were described above. In such scenarios, three or fewer magnet magnetometer pairs (120) can be used to more than adequately detect these shapes and orientations.

To wit, in one explanatory embodiment three magnet magnetometer pairs (120) are used to determine each of these shapes. As shown in FIG. 15, in one or more embodiments a first magnet magnetometer pair 1501 is positioned such that one of the magnet or magnetometer is situated in the third linkage member 1502 and another of the magnet or magnetometer is situated in the fourth linkage member 1503. As shown, this is suitable to detect the L shape shown in FIG. 15. When signals from corresponding accelerometers are used, one or more processors (112) of the deformable electronic device 100 can determine if the deformable electronic device 100 is in the pad orientation or the stand orientation of FIG. 15.

As shown in FIG. 16, in one or more embodiments a second magnet magnetometer pair 1601 is positioned such that one of the magnet or magnetometer is situated in the fourteenth linkage member 1602 and another of the magnet or magnetometer is situated in the fifteenth linkage member 1603. As shown, this is suitable for the one or more processors (112) of the deformable electronic device 100 to detect the hook shape shown in FIG. 16.

As shown in FIG. 17, in one or more embodiments a third magnet magnetometer pair 1701 is positioned such that one of the magnet or magnetometer is situated in the eighth linkage member 1702 and another of the magnet or magnetometer is situated in the ninth linkage member 1703. As shown, this is suitable to detect the tent shape shown in FIG. 17. When signals from corresponding accelerometers are used, one or more processors (112) of the deformable electronic device 100 can determine if the deformable electronic device 100 is in the pad orientation of FIG. 17 or the lean back orientation.

Turning now to FIG. 18, illustrated therein is one explanatory table 1800 showing thresholds for the magnet magnetometer pairs (120) and accelerometers (125) that can be used to determine whether the deformable electronic device (100) is in an undeformed shape, a wrap shape, a L shape with stand orientation, a L shape with pad orientation, a tent shape with lean back orientation, or a tent shape with stand orientation. The table 1800 represents expected magnetic trimag (bend) thresholds from the magnet magnetometer pairs (120), and gravity vector outputs from the accelerometers (125) situated at each end of a deformable electronic device (100) for each predefined pose and orientation. The final pose/orientation determination ultimately depends upon bend determination only or a combination of bend and gravity vector comparison.

The table 1800 of FIG. 18 presumes the three magnet magnetometer pairs (120) located as described above with reference to FIGS. 15-17. It should be noted that the limited number of shapes and orientations provides information about how one or more processors (112) of a deformable electronic device (100) can detect a deformed shape from a plurality of predefined shapes and is not intended to be comprehensive. Other shapes, orientations, numbers of shapes, numbers of orientations, and thresholds will be obvious to those of ordinary skill in the art having the benefit of this table 1800 of this disclosure.

To illustrate by example, one or more processors (112) of a deformable electronic device (100) can determine that the deformable electronic device 100 is in the undeformed state when the amount of deformation detected by the three magnet magnetometer pairs (120) each detect less than ten percent deformation. In one or more embodiments, signals from the accelerometers are not used to detect the undeformed shape. In one or more embodiments, upon detecting the undeformed shape, the one or more processors (112) store the undeformed shape in the memory (113) of the deformable electronic device (100) until one of the deformed shapes subsequently shown in the table 1800 is detected. This "store until another shape is detected" mode of operation provides hysteresis to prevent the detected shape from constantly changing. When the detected shape is used to configure content presentation on a flexible display (105) of the deformable electronic device (100), this additional hysteresis provides a better user experience.

In one or more embodiments, the wrap shape is determined from either an amount of deformation detected by the three magnet magnetometer pairs (120) or the signals from the accelerometers (125). Illustrating by example, of the gravity vectors detected by the accelerometers (125) are greater than 160-degrees apart in the Y-Z plane, this indicates a wrap shape. Similarly, either a first and third magnet magnetometer pair detecting deformation of between ten and eighty-five percent, with a second magnet magnetometer pair detecting deformation greater than fifty-five percent, or the first and third magnet magnetometer pair combining to detect at least thirty percent deformation can be used to detect the wrap shape.

Detecting either the L shape or the tent shape can be done using the three magnet magnetometer pairs (120) alone. However, detecting shape and orientation requires both the three magnet magnetometer pairs (120) and the accelerometers (125) as shown in the table. Given the examples provided above, those of ordinary skill in the art should be able to readily read the table to determine how one explanatory embodiment of the disclosure detects deformation and orientation with hysteresis. As noted above, others will be obvious to those of ordinary skill in the art having the benefit of this disclosure. Accordingly, a line-by-line recitation of how to read the table is omitted here in the interest of brevity.

Figure 19:
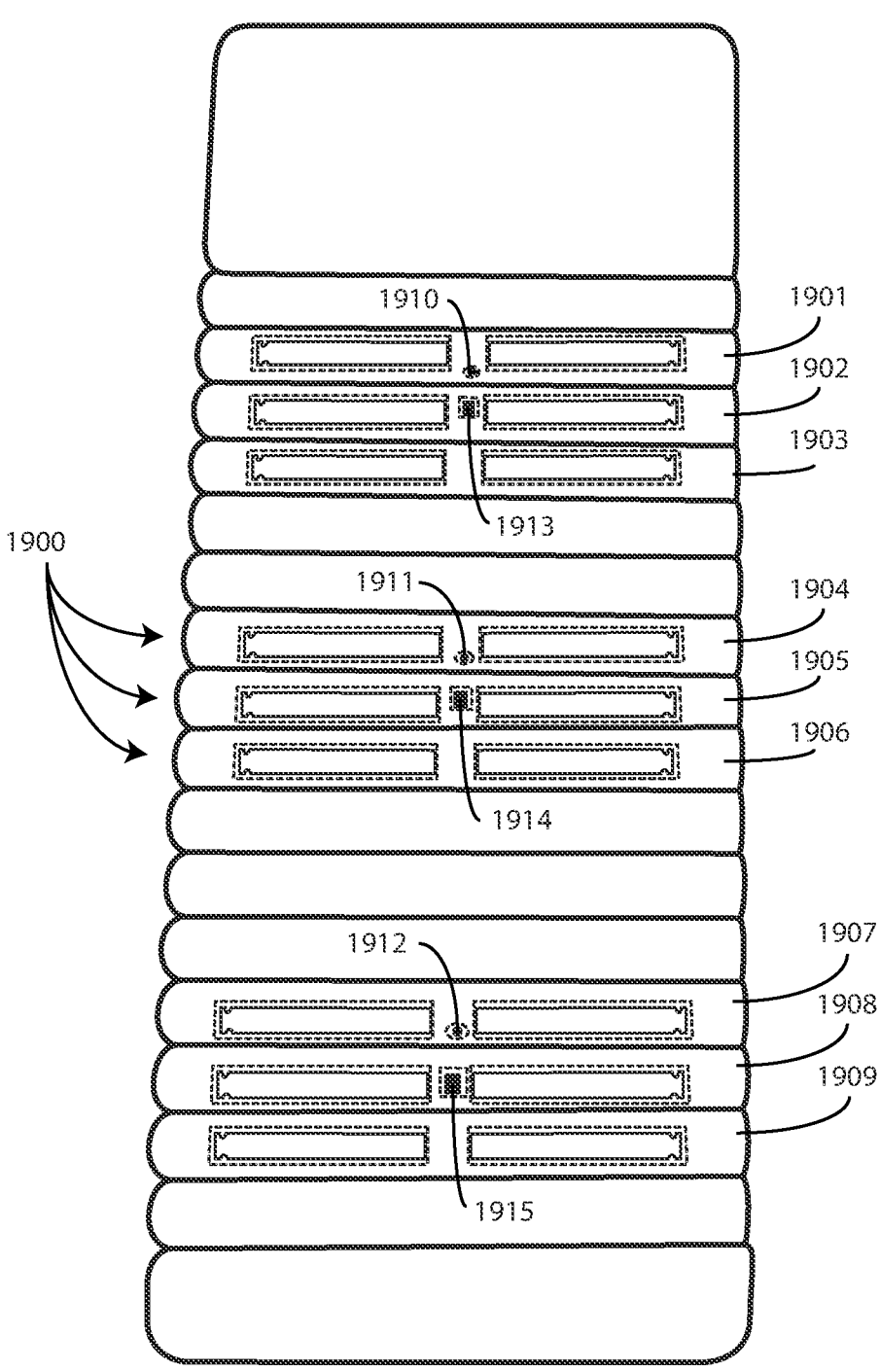
FIG. 19 illustrates one explanatory deformable electronic device with cut-away portions showing one explanatory magnet magnetometer system in accordance with one or more embodiments of the disclosure.

A second question that may arise is where the magnet and magnetometer should be located within each linkage member. Recall from above that in one or more embodiments each linkage member houses a pair of energy storage devices. Turning now to FIG. 19, illustrated therein is one suitable location for the components of each magnet magnetometer pair (120) in accordance with one explanatory example.

In FIG. 19, at least some linkage members, e.g., linkage member 1901,1902,1903,1904, 1905,1906,1907,1908,1909 of a plurality of linkage members 1900 house a rechargeable electrochemical cell pair. The rechargeable electrochemical cell pairs abut each rechargeable electrochemical cell back to back across the width of each linkage member 1901,1902, 1903,1904, 1905,1906,1907,1908,1909. In this illustrative embodiment, the first magnetometer 1910, the second magnetometer 1911, and the third magnetometer 1912 are each situated between a corresponding pair of rechargeable electrochemical cells. Similarly, the first magnet 1913, the second magnet 1914, and the third magnet 1915 are also situated between a corresponding pair of rechargeable electrochemical cells in linkage members adjacent to those in which the magnetometers are situated.

By contrast, turning now to FIG. 20, illustrated therein is another deformable electronic device 2000 that has, rather than magnet magnetometer pairs, magnet magnetometer "groupings" situated at the outer edges of the linkage members with the rechargeable electrochemical cells positioned between each magnetometer and magnet. In FIG. 20, every single linkage member has either a magnetometer or magnet. Indeed, some have two magnetometers.

Turning now to FIG. 21, in this deformable electronic device 2100 the magnet magnetometer groupings are staggered with most linkage members including both a magnetometer and magnet. FIGS. 20-21 illustrate just a few ways in which magnets and magnetometers can be arranged in a deformable electronic device in accordance with embodiments of the disclosure. These are in addition to the arrangement described above with reference to FIGS. 11 and 15-17. Others will be obvious to those of ordinary skill in the art having the benefit of this disclosure.

Figure 22:
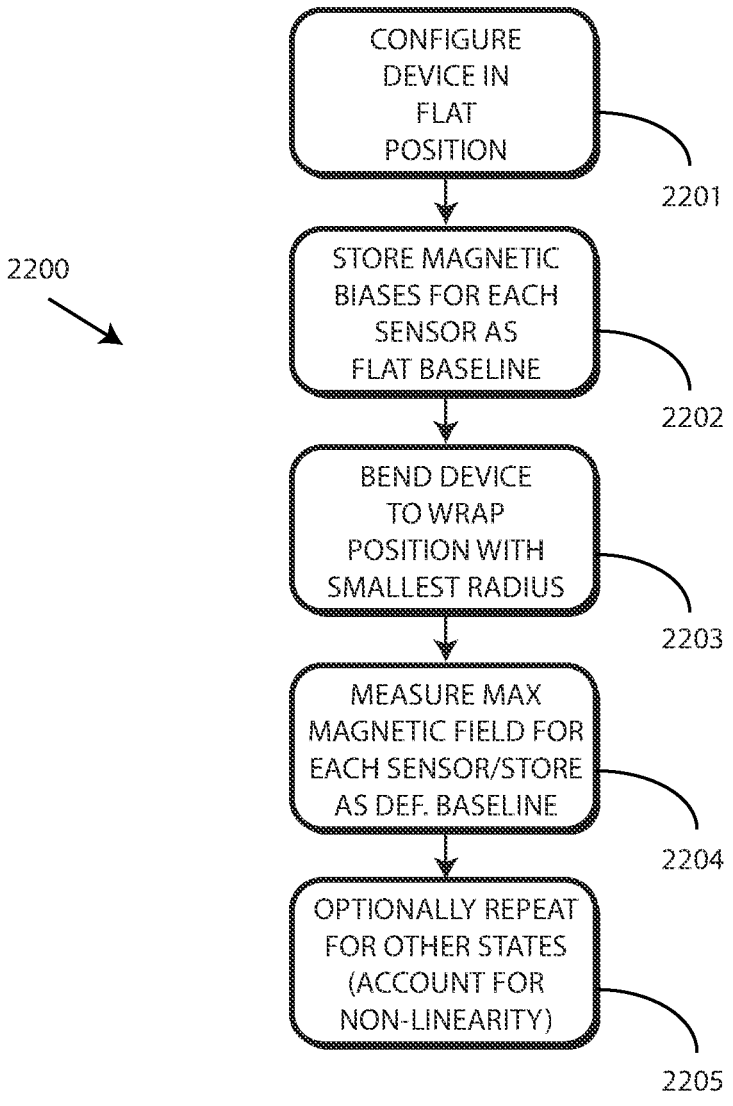
FIG. 22 illustrates one explanatory calibration method for a magnet magnetometer system in accordance with one or more embodiments of the disclosure.

Turning now to FIG. 22, illustrated therein is one explanatory method 2200 for calibrating a deformable electronic device in accordance with one or more embodiments of the disclosure. The method 2200 provides an initial calibration but may also be used in the field for maintenance adjustments.

At step 2201, the deformable electronic device is transitioned to the undeformed shape. At step 2202, baseline magnetic biases are stored for each magnetometer. These biases can then be applied to deliver an undeformed state reading.

At step 2203, the deformable electronic device is transformed into the fully bent, or wrap, shape. At step 2204, a second calibration is applied to measure the maximum expected magnetic field with each magnetometer. This defines the upper limit of magnetometer readings for fully bent states.

If needed, more elaborate calibrations at partial bend positions can be made to measure biases at optional step 2205. Such measurements can be made to account for non-linearity of the magnetometer readings, or alternatively for finer granularity of shape detection or for the creation of a theoretical mathematical model.

Figure 23:
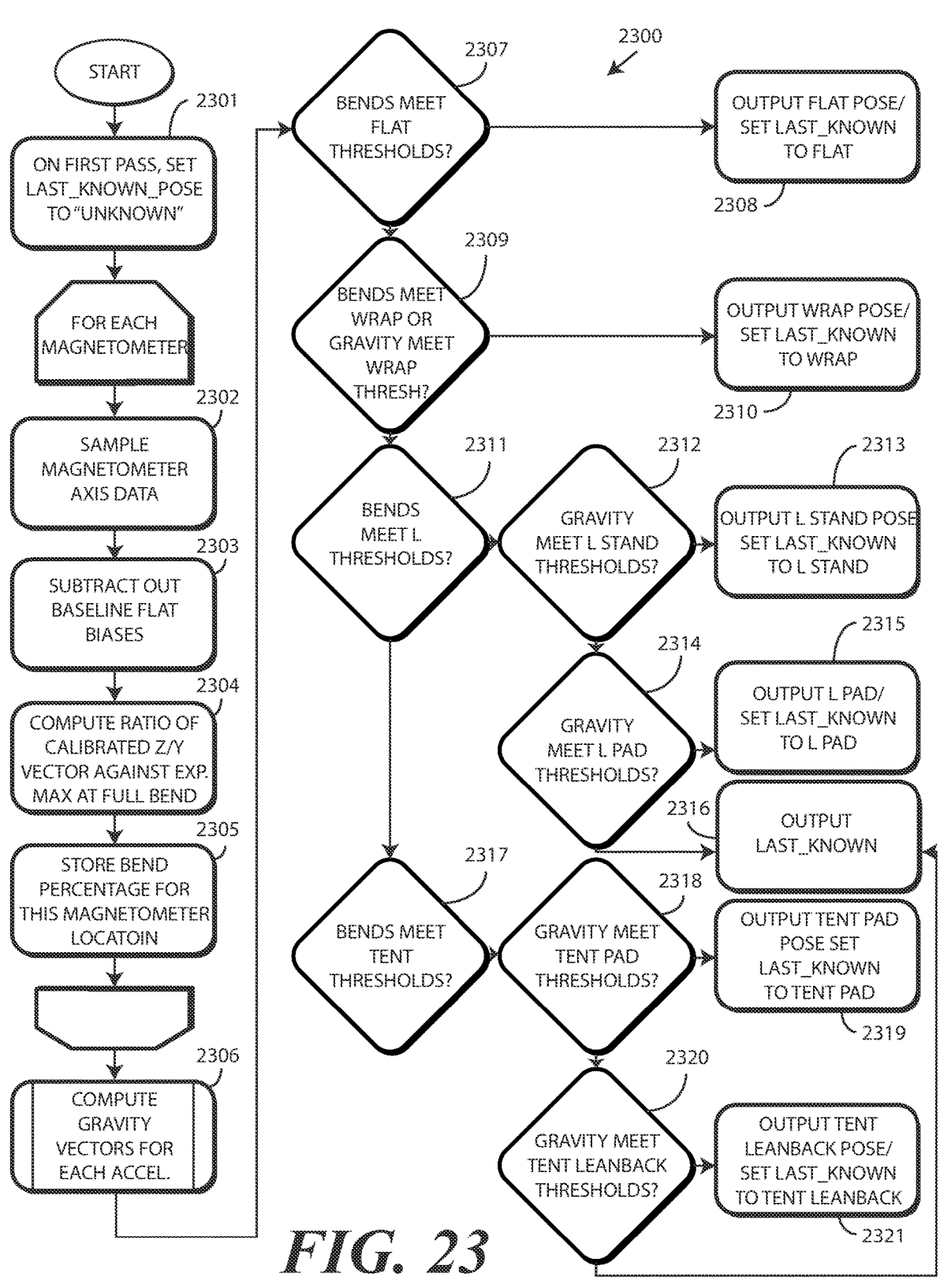
FIG. 23 illustrates one explanatory method in accordance with one or more embodiments of the disclosure.

Turning now to FIG. 23, illustrated therein is one explanatory method 2300 for measuring deformation and orientation of a deformable electronic device in accordance with one or more embodiments of the disclosure. In one or more embodiments, the method 2300 uses the thresholds found in the table (1800) of FIG. 18 and the calibration values created using the method (2200) of FIG. 22. Others can be used as well, as will be obvious to those of ordinary skill in the art having the benefit of this disclosure.

The method 2300 of FIG. 23 detects, using one or more processors of a deformable electronic device from a plurality of magnet magnetometer pairs carried by a plurality of linkage members spanning a flexible display with each magnet magnetometer pair having a magnet and a magnetometer situated in adjacent linkage members, whether the deformable electronic device is in a deformed shape selected from a predefined plurality of deformed shapes. The method 2300 then writes the deformed shape to a memory of the deformable electronic device. Since the table (1800) of FIG. 18 provides hysteresis, this written detected shape in memory remains until the one or more processors detect the deformable electronic device transitioning to another deformed shape selected from the predefined plurality of deformed shapes, wherein the one or more processors overwrite the deformed shape with another deformed shape that is detected. If the deformable electronic device is detected being in the undeformed shape, this can overwrite a detected deformed shape, and so forth. The method 2300 can also determine, from a plurality of accelerometers as shown in the table (1800) of FIG. 18, whether a particular shape is in a pad orientation, stand orientation, lean back orientation, or other orientation.

Beginning at step 2301, presuming that the method 2300 is being run for the first time, there will not have been a detected shape, either undeformed or deformed. Accordingly, the one or more processors write an "unknown" shape to the memory of the deformable electronic device.

Beginning at step 2302, for each magnetometer of each magnet magnetometer pair, the one or more processors sample the axis data. While many magnetometers measure fields in three dimensions, embodiments of the disclosure contemplate that adequate detection of deformation can be obtained using only two axes, namely, the Z and Y axes.

At step 2303, the one or more processors subtract out the baseline biases determined at step (2202) of the method (2200) of FIG. 22 for each magnetometer of each magnet magnetometer pair. At step 2304, the one or more processors compute the ratio of the measured axis data to the axis data detected at maximum bend at step (2204) of the method (2200) of FIG. 22. As noted above, in many cases the measurements of each magnetometer of each magnet magnetometer pair will be non-linear as the deformable electronic device transitions from undeformed to fully deformed. Accordingly, the ratios determined at step 2304 may also follow a non-linear relationship as the deformable electronic device transitions from undeformed to deformed. The bend percentage is then stored in the memory of the deformable electronic device at step 2305 for each magnetometer of each magnet magnetometer pair.

At step 2306, gravity vectors for each accelerometer are measured. Thereafter, usage of the table (1800) of FIG. 18 or another suitable table results in the determination of either an undeformed shape or a deformed shape selected from a predefined plurality of deformed shapes.

Illustrating by example, decision 2307 determines whether the measurements of each magnetometer of each magnet magnetometer pair meet the undeformed thresholds shown in row two of the table (1800) of FIG. 18. If they do, one or more processors of the deformable electronic device write the undeformed shape as being detected to memory at step 2308.

Otherwise, decision 2309 determines whether the measurements of each magnetometer of each magnet magnetometer pair, or alternatively the measurements of the accelerometers, meet the wrap thresholds shown in row three the table (1800) of FIG. 18. If they do, one or more processors of the deformable electronic device write the wrap shape as being detected to memory at step 2310.

Decision 2311 determines whether the measurements of each magnetometer of each magnet magnetometer pair meet the undeformed thresholds shown in row four or five of the table (1800) of FIG. 18. If they do, the method proceeds to decision 2312 where the one or more processors determine whether accelerometer measurements determine that the orientation is a stand orientation. Where both decision 2311 and decision 2312 are true, the one or more processors write the L stand shape to memory at step 2313.

Where decision 2311 is true but decision 2312 fails, decision 2314 determines whether accelerometer measurements determine that the orientation is a pad orientation. Where both decision 2311 and decision 2314 are true, the one or more processors write the L pad shape to memory at step 2315. Otherwise, the last output state remains at step 2316 due to the hysteresis associated with writing and not overwriting until a new shape from the predetermined number of shapes is identified.

Decision 2317 determines whether the measurements of each magnetometer of each magnet magnetometer pair meet the undeformed thresholds shown in row six or seven of the table (1800) of FIG. 18. If they do, the method proceeds to decision 2318 where the one or more processors determine whether accelerometer measurements determine that the orientation is a pad orientation. Where both decision 2317 and decision 2318 are true, the one or more processors write the tent pad shape to memory at step 2319.

Where decision 2317 is true but decision 2318 fails, decision 2320 determines whether accelerometer measurements determine that the orientation is a lean back orientation. Where both decision 2317 and decision 2320 are true, the one or more processors write the tent lean back shape to memory at step 2321. Otherwise, the last output state remains at step 2316 due to the hysteresis associated with writing and not overwriting until a new shape from the predetermined number of shapes is identified. The method can repeat for additional shapes.

Note that while only the shapes of the table (1800) of FIG. 18 are shown in the method 2300 of FIG. 23, these decision cycles could be extended for more and more shapes, eventually approaching a continuum of predefined shapes for maximum granularity. However, when control of the user interface in response to bending is the goal, embodiments of the disclosure contemplate that a better user experience will result from fewer predefined shapes since this results in less jitter and flicker on the flexible display.

Figure 24:
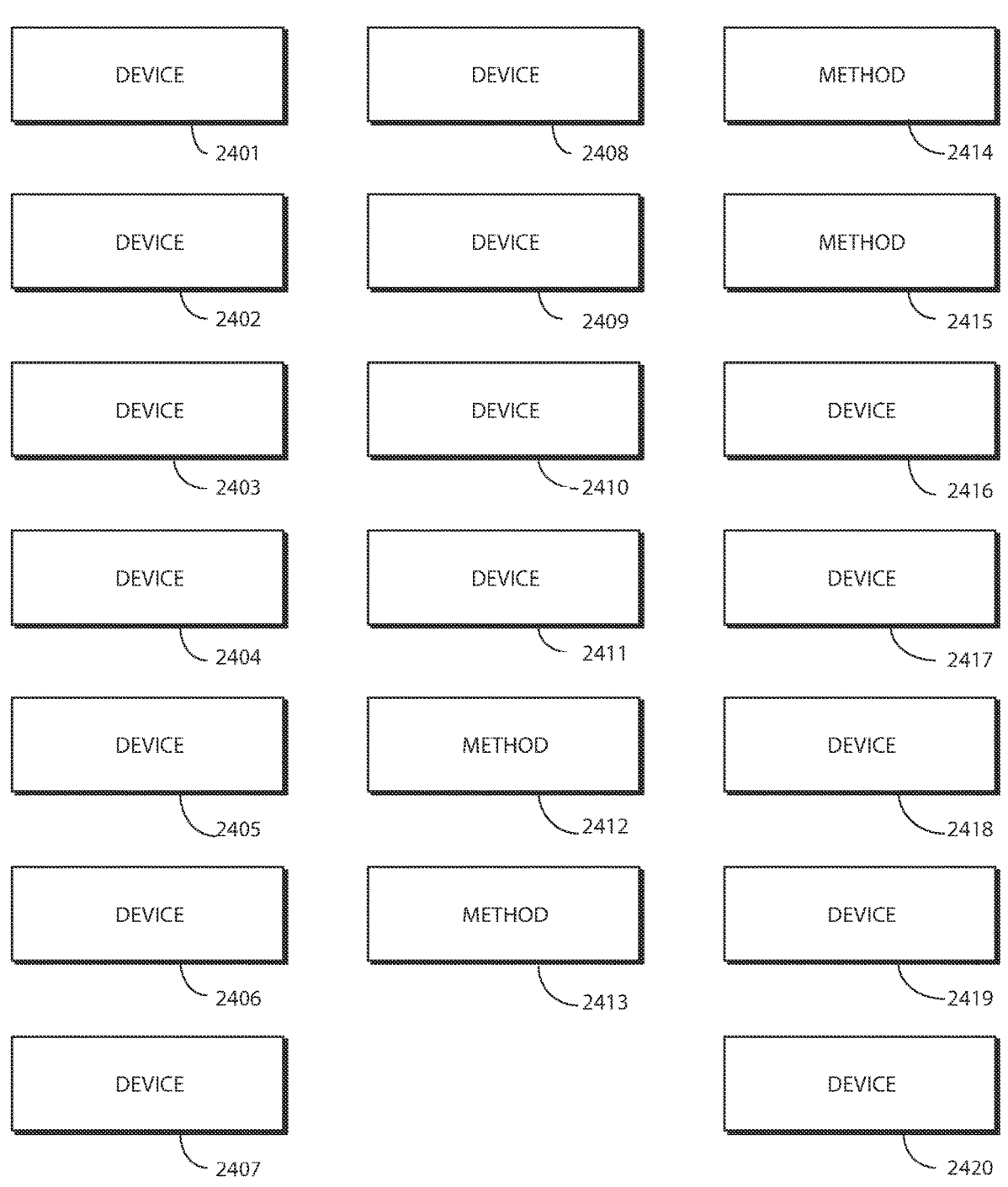
FIG. 24 illustrates one or more embodiments of the disclosure.

Turning now to FIG. 24, illustrated therein are various embodiments of the disclosure. The embodiments of FIG. 24 are shown as labeled boxes in FIG. 24 due to the fact that the individual components of these embodiments have been illustrated in detail in FIGS. 1-23, which precede FIG. 24. Accordingly, since these items have previously been illustrated and described, their repeated illustration is no longer essential for a proper understanding of these embodiments. Thus, the embodiments are shown as labeled boxes.

At 2401, a deformable electronic device comprises a flexible display supported by a deformable housing comprising a plurality of linkage members. At 2401, the deformable electronic device comprises one or more magnet magnetometer pairs.

At 2401, each magnet magnetometer pair comprises a magnetometer situated in a linkage member of the plurality of linkage members and at least one corresponding magnet situated in another linkage member of the plurality of linkage members that is adjacent to the linkage member among the plurality of linkage members. At 2401, the deformable electronic device comprises one or more processors operable with one or more magnetometers of the one or more magnet magnetometer pairs. At 2401, the one or more processors are configured to identify a deformed shape of the deformable electronic device from signals received from the one or more magnetometers.

At 2402, the one or more magnet magnetometer pair of 2401 comprise at least three magnet magnetometer pairs. At 2403, each magnet magnetometer pair of 2402 is separated from each other magnet magnetometer pair by at least one linkage member of the plurality of linkage members. At 2404, the plurality of linkage members of 2403 comprises at least fifteen linkage members.

At 2405, at least some linkage members of the plurality of linkage members of 2401 house a rechargeable electrochemical cell pair. At 2405, the magnetometer of odd instances of the at least some linkage members are situated between a first pair of rechargeable electrochemical cells situated within the odd instances of the at least some linkage members. At 2405, the at least one corresponding magnet of even instances of the at least some linkage members are situated between a second pair of rechargeable electrochemical cells situated within the even instances of the at least some linkage members.

At 2406, the deformed shape of the deformable electronic device of 2401 is one of a wrap shape, a L shape, or a tent shape. At 2407, the one or more processors of 2406 are further configured to identify an undeformed shape of the deformable electronic device from the signals received from the one or more magnetometers.

At 2408, the deformable electronic device of 2407 further comprises a memory operable with the one or more processors. At 2408, the one or more processors are configured, upon detecting the undeformed shape, to store the undeformed shape in the memory until the one of the wrap shape, the L shape, or the tent shape is detected.

At 2409, the deformed shape of 2401 is one of a L stand shape, a L pad shape, a tent pad shape, or a tent lean back shape. At 2410, the deformable housing of 2409 further comprises an electronic circuit component housing situated to one side of the plurality of linkage members and another electronic circuit component housing situated to another side of the plurality of linkage members. At 2410, the deformable housing comprises a first accelerometer situated in the electronic circuit component housing and a second accelerometer situated in the other electronic circuit component housing. At 2410, The one or more processors are configured to distinguish between the L pad shape and the L stand shape, or between the tent pad shape and the tent lean back shape, using other signals received from the first accelerometer and the second accelerometer. At 2411, the magnetometer of each magnet magnetometer pair is situated off-center in the linkage member of the plurality of linkage members.

At 2412, a method in a deformable electronic device comprises detecting, by one or more processors from a plurality of magnet magnetometer pairs carried by a plurality of linkage members spanning a flexible display with each magnet magnetometer pair having a magnet and a magnetometer situated in adjacent linkage members, whether the deformable electronic device is in a deformed shape selected from a predefined plurality of deformed shapes. At 2412, the method comprises writing, to a memory by the one or more processors, the deformed shape of the deformable electronic device.

At 2413, the method of 2412 further comprises detecting, by the one or more processors from the plurality of magnet magnetometer pairs, the deformable electronic device transitioning to another deformed shape selected from the predefined plurality of deformed shapes and overwriting, in the memory by the one or more processors, the deformed shape with the other deformed shape. At 2414, the method of 2412 further comprises detecting, by the one or more processors from the plurality of magnet magnetometer pairs, the deformable electronic device transitioning to an undeformed shape and overwriting, in the memory by the one or more processors, the deformed shape with the undeformed shape.

At 2415, the deformed shape of 2412 comprises one of a L shape or a tent shape. At 2415, the method of 2412 further comprises determining, by the one or more processors from a plurality of accelerometers carried by the deformable electronic device when the one of the L shape or the tent shape is the L shape, whether the L shape is in a stand orientation or a pad orientation and determining, by the one or more processors from the plurality of accelerometers carried by the deformable electronic device when the one of the L shape or the tent shape is the tent shape, whether the tent shape is in a stand orientation or a lean back orientation.

At 2416, a deformable electronic device comprises a flexible display spanning a first major surface of the deformable electronic device, a plurality of linkage members, with at least some linkage members of the plurality of linkage members comprising one or more energy storage devices situated along a second major surface of the deformable electronic device, and one or more processors.

At 2416, the deformable electronic device comprises at least a first magnetometer situated in a first linkage member, a first magnet situated in a second linkage member that is adjacent to the first linkage member, a second magnetometer situated in a third linkage member, and a second magnet situated in a fourth linkage member that is adjacent to the third linkage member. At 2416, the one or more processors are configured to determine whether the deformable electronic device is deformed, and into what shape, from signals from the first magnetometer and the second magnetometer.

At 2417, the deformable electronic device of 2416 further comprises at least a third magnetometer situated within a fifth linkage member and a third magnet situated within a sixth linkage member that is adjacent to the fifth linkage member. At 2417, the one or more processors are further configured to determine whether the deformable electronic device is deformed, and into what shape, from signals from the third magnetometer.

At 2418, each linkage member of 2417 comprises a pair of energy storage devices. At 2418, the first magnetometer, the second magnetometer, the third magnetometer, the first magnet, the second magnet, and the third magnet are each situated between a corresponding pair of energy storage devices.

At 2419, at least one linkage member of 2417 separates the first linkage member and the second linkage member from the third linkage member and the fourth linkage member, and at least one other linkage member separates the third linkage member and the fourth linkage member from the fifth linkage member and the sixth linkage member. At 2420, the deformable electronic device of 2416 further comprises a first accelerometer situated to one side of the plurality of linkage members and a second accelerometer situated to a second side of the plurality of linkage members. At 2420, the one or more processors are configured to determine, when the deformable electronic device is deformed, whether the deformable electronic device is in a pad orientation, a stand orientation, or a lean back orientation in three-dimensional space from signals from the first accelerometer and/or other signals from the second accelerometer.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A deformable electronic device, comprising:
   a flexible display supported by a deformable housing comprising a plurality of linkage members;

one or more magnet magnetometer pairs, each magnet magnetometer pair comprising a magnetometer situated in a linkage member of the plurality of linkage members and at least one corresponding magnet situated in another linkage member of the plurality of linkage members that is adjacent to the linkage member among the plurality of linkage members;

a memory; and one or more processors operable with one or more magnetometers of the one or more magnet magnetometer pairs and configured to identify whether the deformable electronic device is in a deformed shape selected from a predefined plurality of deformed shapes from signals received from the one or more magnetometers and write, to the memory, the deformed shape of the deformable electronic device.

2. The deformable electronic device of claim 1, wherein the one or more magnet magnetometer pairs comprise at least three magnet magnetometer pairs.

3. The deformable electronic device of claim 2, wherein the each magnet magnetometer pair is separated from each other magnet magnetometer pair by at least one linkage member of the plurality of linkage members.

4. The deformable electronic device of claim 3, wherein the plurality of linkage members comprises at least fifteen linkage members.

5. The deformable electronic device of claim 1, wherein:

at least some linkage members of the plurality of linkage members house a rechargeable electrochemical cell pair;

the magnetometer of odd instances of the at least some linkage members is situated between a first pair of rechargeable electrochemical cells situated within the odd instances of the at least some linkage members; and the at least one corresponding magnet of even instances of the at least some linkage members are situated between a second pair of rechargeable electrochemical cells situated within the even instances of the at least some linkage members.

6. The deformable electronic device of claim 1, wherein the deformed shape of the deformable electronic device is one of a wrap shape, a L shape, or a tent shape.

7. The deformable electronic device of claim 6, wherein the one or more processors are further configured to identify an undeformed shape of the deformable electronic device from the signals received from the one or more magnetometers.

8. The electronic device of claim 7, wherein the one or more processors are configured, upon detecting the undeformed shape, to store the undeformed shape in the memory until the one of the wrap shape, the L shape, or the tent shape is detected.

9. The deformable electronic device of claim 1, wherein the deformed shape of the deformable electronic device is one of a L stand shape, a L pad shape, a tent pad shape, or a tent lean back shape.

10. The deformable electronic device of claim 9, the deformable housing further comprising:

an electronic circuit component housing situated to one side of the plurality of linkage members;

another electronic circuit component housing situated to another side of the plurality of linkage members;

a first accelerometer situated in the electronic circuit component housing; and a second accelerometer situated in the another electronic circuit component housing;

wherein the one or more processors are configured to distinguish between the L pad shape and the L stand shape, or between the tent pad shape and the tent lean back shape, using other signals received from the first accelerometer and the second accelerometer.

11. The deformable electronic device of claim 1, wherein the magnetometer of the each magnet magnetometer pair is situated off-center in a linkage member of the plurality of linkage members.

12. A method in a deformable electronic device, the method comprising:

detecting, by one or more processors from a plurality of magnet magnetometer pairs carried by a plurality of linkage members spanning a flexible display with each magnet magnetometer pair having a magnet and a magnetometer situated in adjacent linkage members, whether the deformable electronic device is in a deformed shape selected from a predefined plurality of deformed shapes; and writing, to a memory by the one or more processors, the deformed shape of the deformable electronic device.

13. The method of claim 12, further comprising:

detecting, by the one or more processors from the plurality of magnet magnetometer pairs, the deformable electronic device transitioning to another deformed shape selected from the predefined plurality of deformed shapes; and overwriting, in the memory by the one or more processors, the deformed shape with the another deformed shape.

14. The method of claim 12, further comprising:

detecting, by the one or more processors from the plurality of magnet magnetometer pairs, the deformable electronic device transitioning to an undeformed shape; and overwriting, in the memory by the one or more processors, the deformed shape with the undeformed shape.

15. The method of claim 12, wherein the deformed shape comprises one of a L shape or a tent shape, further comprising:

determining, by the one or more processors from a plurality of accelerometers carried by the deformable electronic device when the one of the L shape or the tent shape is the L shape, whether the L shape is in a stand orientation or a pad orientation; and determining, by the one or more processors from the plurality of accelerometers carried by the deformable electronic device when the one of the L shape or the tent shape is the tent shape, whether the tent shape is in a stand orientation or a lean back orientation.

16. A deformable electronic device, comprising:

a flexible display spanning a first major surface of the deformable electronic device;

a plurality of linkage members, with at least some linkage members of the plurality of linkage members comprising one or more energy storage devices situated along a second major surface of the deformable electronic device;

one or more processors;

a memory; and at least:

a first magnetometer situated in a first linkage member;

a first magnet situated in a second linkage member that is adjacent to the first linkage member;

a second magnetometer situated in a third linkage member; and a second magnet situated in a fourth linkage member that is adjacent to the third linkage member, wherein the one or more processors are configured to determine whether the deformable electronic device is deformed, and into what shape selected from a predefined plurality of deformed shapes, from signals from the first magnetometer and the second magnetometer and, when the deformable electronic device is deformed, write the shape to the memory.

17. The deformable electronic device of claim 16, further comprising at least:

a third magnetometer situated within a fifth linkage member; and a third magnet situated within a sixth linkage member that is adjacent to the fifth linkage member;

wherein the one or more processors are further configured to determine whether the deformable electronic device is deformed, and into what shape, from signals from the third magnetometer.

18. The deformable electronic device of claim 17, wherein each linkage member comprises a pair of energy storage devices, wherein the first magnetometer, the second magnetometer, the third magnetometer, the first magnet, the second magnet, and the third magnet are each situated between a corresponding pair of energy storage devices.

19. The deformable electronic device of claim 17, wherein at least one linkage member separates the first linkage member and the second linkage member from the third linkage member and the fourth linkage member, and at least one other linkage member separates the third linkage member and the fourth linkage member from the fifth linkage member and the sixth linkage member.

20. The deformable electronic device of claim 16, further comprising a first accelerometer situated to one side of the plurality of linkage members and a second accelerometer situated to a second side of the plurality of linkage members, wherein the one or more processors are configured to determine, when the deformable electronic device is deformed, whether the deformable electronic device is in a pad orientation, a stand orientation, or a lean back orientation in three-dimensional space from signals from the first accelerometer and/or other signals from the second accelerometer.

* * * * *